(12) United States Patent
Lovett

(10) Patent No.: US 11,664,063 B2
(45) Date of Patent: May 30, 2023

(54) APPARATUSES AND METHODS FOR COUNTERING MEMORY ATTACKS

(71) Applicant: MICRON TECHNOLOGY, INC., Boise, ID (US)

(72) Inventor: Simon J. Lovett, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/444,925

(22) Filed: Aug. 12, 2021

(65) Prior Publication Data
US 2023/0047007 A1   Feb. 16, 2023

(51) Int. Cl.
*G11C 7/00* (2006.01)
*G11C 11/406* (2006.01)
*G06F 7/58* (2006.01)
*H03K 3/84* (2006.01)

(52) U.S. Cl.
CPC ........ *G11C 11/40611* (2013.01); *G06F 7/584* (2013.01); *G11C 11/40615* (2013.01); *H03K 3/84* (2013.01)

(58) Field of Classification Search
CPC ................................................ G11C 11/40611
USPC ......................................................... 365/222
See application file for complete search history.

(56) References Cited

U.S. PATENT DOCUMENTS

| | | | |
|---|---|---|---|
| 1,158,364 | A | 10/1915 | Bibb |
| 3,633,175 | A | 1/1972 | Harper |
| 5,291,198 | A | 3/1994 | Dingwall et al. |
| 5,299,159 | A | 3/1994 | Balistreri et al. |
| 5,422,850 | A | 6/1995 | Sukegawa et al. |
| 5,638,317 | A | 6/1997 | Tran |
| 5,699,297 | A | 12/1997 | Yamazaki |
| 5,768,196 | A | 6/1998 | Bloker |
| 5,933,377 | A | 8/1999 | Hidaka |
| 5,943,283 | A | 8/1999 | Wong et al. |
| 5,970,507 | A | 10/1999 | Kato et al. |
| 5,999,471 | A | 12/1999 | Choi |
| 6,002,629 | A | 12/1999 | Kim et al. |
| 6,011,734 | A | 1/2000 | Pappert |
| 6,061,290 | A | 5/2000 | Shirley |
| 6,212,118 | B1 | 4/2001 | Fujita |
| 6,310,806 | B1 | 10/2001 | Higashi et al. |

(Continued)

FOREIGN PATENT DOCUMENTS

| | | |
|---|---|---|
| CN | 1144434 A | 3/1997 |
| CN | 1195173 A | 10/1998 |

(Continued)

OTHER PUBLICATIONS

US 11,264,075 B2, 03/2022, Bell et al. (withdrawn)

(Continued)

*Primary Examiner* — Hoai V Ho
(74) *Attorney, Agent, or Firm* — Dorsey & Whitney LLP

(57) ABSTRACT

Aggressor rows may be detected by comparing access count values of word lines to a threshold value. Based on the comparison, a word line may be determined to be an aggressor row. The threshold value may be dynamically generated, such as a random number generated by a random number generator. In some examples, a random number may be generated each time an activation command is received. Responsive to detecting an aggressor row, a targeted refresh operation may be performed.

15 Claims, 5 Drawing Sheets

(56) References Cited

U.S. PATENT DOCUMENTS

| | | |
|---|---|---|
| 6,317,381 B1 | 11/2001 | Gans et al. |
| 6,373,738 B1 | 4/2002 | Towler et al. |
| 6,392,952 B1 | 5/2002 | Chen et al. |
| 6,424,582 B1 | 7/2002 | Ooishi |
| 6,434,064 B2 | 8/2002 | Nagai |
| 6,452,868 B1 | 9/2002 | Fister |
| 6,480,931 B1 | 11/2002 | Buti et al. |
| 6,515,928 B2 | 2/2003 | Sato et al. |
| 6,567,340 B1 | 5/2003 | Natarai et al. |
| 6,950,364 B2 | 9/2005 | Kim |
| 7,027,343 B2 | 4/2006 | Sinha et al. |
| 7,057,960 B1 | 6/2006 | Fiscus et al. |
| 7,082,070 B2 | 7/2006 | Hong |
| 7,187,607 B2 | 3/2007 | Koshikawa et al. |
| 7,203,113 B2 | 4/2007 | Takahashi et al. |
| 7,203,115 B2 | 4/2007 | Eto et al. |
| 7,209,402 B2 | 4/2007 | Shinozaki et al. |
| 7,215,588 B2 | 5/2007 | Lee |
| 7,283,380 B1 | 10/2007 | Srinivasan et al. |
| 7,304,875 B1 | 12/2007 | Lien et al. |
| 7,319,602 B1 | 1/2008 | Srinivasan et al. |
| 7,444,577 B2 | 10/2008 | Best et al. |
| 7,551,502 B2 | 6/2009 | Dono et al. |
| 7,565,479 B2 | 7/2009 | Best |
| 7,830,742 B2 | 11/2010 | Han |
| 7,870,362 B2 | 1/2011 | Hong et al. |
| 7,872,907 B2 | 1/2011 | Okayama et al. |
| 8,174,921 B2 | 5/2012 | Kim et al. |
| 8,400,805 B2 | 3/2013 | Yoko |
| 8,451,677 B2 | 5/2013 | Okahiro et al. |
| 8,625,360 B2 | 1/2014 | Iwamoto et al. |
| 8,676,725 B1 | 3/2014 | Lin et al. |
| 8,681,578 B2 | 3/2014 | Narui |
| 8,756,368 B2 | 6/2014 | Best et al. |
| 8,811,100 B2 | 8/2014 | Ku |
| 8,862,973 B2 | 10/2014 | Zimmerman et al. |
| 8,938,573 B2 | 1/2015 | Greenfield et al. |
| 9,032,141 B2 | 5/2015 | Bains et al. |
| 9,047,978 B2 | 6/2015 | Bell et al. |
| 9,058,900 B2 | 6/2015 | Kang |
| 9,087,554 B1 | 7/2015 | Park |
| 9,087,602 B2 | 7/2015 | Youn et al. |
| 9,117,544 B2 | 8/2015 | Bains et al. |
| 9,123,447 B2 | 9/2015 | Lee |
| 9,153,294 B2 | 10/2015 | Kang |
| 9,190,137 B2 | 11/2015 | Kim et al. |
| 9,190,139 B2 | 11/2015 | Jung et al. |
| 9,251,885 B2 | 2/2016 | Greenfield et al. |
| 9,286,964 B2 | 3/2016 | Halbert et al. |
| 9,299,457 B2 | 3/2016 | Chun et al. |
| 9,311,985 B2 | 4/2016 | Lee et al. |
| 9,324,398 B2 | 4/2016 | Jones et al. |
| 9,384,821 B2 | 7/2016 | Bains et al. |
| 9,390,782 B2 | 7/2016 | Best et al. |
| 9,412,432 B2 | 8/2016 | Narui et al. |
| 9,424,907 B2 | 8/2016 | Fujishiro |
| 9,484,079 B2 | 11/2016 | Lee |
| 9,514,850 B2 | 12/2016 | Kim |
| 9,570,143 B2 | 2/2017 | Lim et al. |
| 9,646,672 B1 | 5/2017 | Kim et al. |
| 9,672,889 B2 | 6/2017 | Lee et al. |
| 9,685,240 B1 | 6/2017 | Park |
| 9,691,466 B1 | 6/2017 | Kim |
| 9,697,913 B1 | 7/2017 | Mariani et al. |
| 9,734,887 B1 | 8/2017 | Tavva |
| 9,741,409 B2 | 8/2017 | Jones et al. |
| 9,741,447 B2 | 8/2017 | Akamatsu |
| 9,747,971 B2 | 8/2017 | Bains et al. |
| 9,761,297 B1 | 9/2017 | Tomishima |
| 9,786,351 B2 | 10/2017 | Lee et al. |
| 9,799,391 B1 | 10/2017 | Wei |
| 9,805,782 B1 | 10/2017 | Liou |
| 9,805,783 B2 | 10/2017 | Ito et al. |
| 9,818,469 B1 | 11/2017 | Kim et al. |
| 9,847,118 B1 | 12/2017 | Won |
| 9,865,326 B2 | 1/2018 | Bains et al. |
| 9,865,328 B1 | 1/2018 | Desimone et al. |
| 9,922,694 B2 | 3/2018 | Akamatsu |
| 9,934,143 B2 | 4/2018 | Bains et al. |
| 9,953,696 B2 | 4/2018 | Kim |
| 10,032,501 B2 | 7/2018 | Ito |
| 10,083,737 B2 | 9/2018 | Bains et al. |
| 10,090,038 B2 | 10/2018 | Shin |
| 10,134,461 B2 | 11/2018 | Bell et al. |
| 10,147,472 B2 | 12/2018 | Jones et al. |
| 10,153,031 B2 | 12/2018 | Akamatsu |
| 10,170,174 B1 | 1/2019 | Ito et al. |
| 10,176,860 B1 | 1/2019 | Mylavarapu |
| 10,210,925 B2 | 2/2019 | Bains et al. |
| 10,297,305 B1 | 5/2019 | Moon et al. |
| 10,339,994 B2 | 7/2019 | Ito et al. |
| 10,381,327 B2 | 8/2019 | Ramachandra et al. |
| 10,387,276 B2 | 8/2019 | Ryu |
| 10,446,216 B2 | 10/2019 | Oh et al. |
| 10,490,251 B2 | 11/2019 | Wolff |
| 10,600,462 B2 | 3/2020 | Augustine et al. |
| 10,600,491 B2 | 3/2020 | Chou et al. |
| 10,607,686 B2 | 3/2020 | Akamatsu |
| 10,629,286 B2 | 4/2020 | Lee et al. |
| 10,679,710 B2 | 6/2020 | Hirashima et al. |
| 10,705,900 B2 | 7/2020 | Jin |
| 10,770,127 B2 | 9/2020 | Shore et al. |
| 10,811,066 B2 | 10/2020 | Jones et al. |
| 10,832,792 B1 | 11/2020 | Penney et al. |
| 10,861,519 B2 | 12/2020 | Jones et al. |
| 10,867,660 B2 | 12/2020 | Akamatsu |
| 10,930,335 B2 | 2/2021 | Bell et al. |
| 10,943,636 B1 | 3/2021 | Wu et al. |
| 10,950,289 B2 | 3/2021 | Ito et al. |
| 10,964,378 B2 | 3/2021 | Ayyapureddi et al. |
| 11,011,215 B1 | 5/2021 | Parry et al. |
| 11,043,254 B2 | 6/2021 | Enomoto et al. |
| 11,139,015 B2 | 10/2021 | Brown et al. |
| 11,152,050 B2 | 10/2021 | Morohashi et al. |
| 11,158,364 B2 | 10/2021 | Penney et al. |
| 11,158,373 B2 | 10/2021 | Penney et al. |
| 11,200,942 B2 | 12/2021 | Jenkinson et al. |
| 11,222,682 B1 | 1/2022 | Enomoto et al. |
| 11,257,535 B2 | 2/2022 | Shore et al. |
| 11,264,096 B2 | 3/2022 | Schreck et al. |
| 11,322,192 B2 | 5/2022 | Morohashi et al. |
| 11,361,808 B2 | 6/2022 | Bell et al. |
| 11,386,946 B2 | 7/2022 | Ayyapureddi et al. |
| 11,398,265 B2 | 7/2022 | Wu et al. |
| 11,424,005 B2 | 8/2022 | Penney et al. |
| 11,462,291 B2 | 10/2022 | Pan |
| 11,482,275 B2 | 10/2022 | Ayyapureddi et al. |
| 11,521,669 B2 | 12/2022 | Enomoto et al. |
| 11,568,918 B2 | 1/2023 | Ayyapureddi et al. |
| 2001/0008498 A1 | 7/2001 | Ooishi |
| 2002/0007476 A1 | 1/2002 | Kishino |
| 2002/0078311 A1 | 6/2002 | Matsuzaki et al. |
| 2002/0080677 A1 | 6/2002 | Watanabe et al. |
| 2002/0181301 A1 | 12/2002 | Takahashi et al. |
| 2003/0063512 A1 | 4/2003 | Takahashi et al. |
| 2003/0067825 A1 | 4/2003 | Shimano et al. |
| 2003/0090400 A1 | 5/2003 | Barker |
| 2003/0123301 A1 | 7/2003 | Jang et al. |
| 2003/0193829 A1 | 10/2003 | Morgan et al. |
| 2003/0231540 A1 | 12/2003 | Lazar et al. |
| 2004/0004856 A1 | 1/2004 | Sakimura et al. |
| 2004/0008544 A1 | 1/2004 | Shinozaki |
| 2004/0022093 A1 | 2/2004 | Lee |
| 2004/0052142 A1 | 3/2004 | Ikehashi et al. |
| 2004/0114446 A1 | 6/2004 | Takahashi et al. |
| 2004/0130959 A1 | 7/2004 | Kawaguchi |
| 2004/0174757 A1 | 9/2004 | Garverick et al. |
| 2004/0184323 A1 | 9/2004 | Mori et al. |
| 2004/0213035 A1 | 10/2004 | Cavaleri et al. |
| 2004/0218431 A1 | 11/2004 | Chung et al. |
| 2005/0041502 A1 | 2/2005 | Perner |
| 2005/0105315 A1 | 5/2005 | Shin et al. |
| 2005/0243629 A1 | 11/2005 | Lee |
| 2005/0265104 A1 | 12/2005 | Remaklus et al. |

(56) References Cited

U.S. PATENT DOCUMENTS

| | | |
|---|---|---|
| 2006/0083099 A1 | 4/2006 | Bae et al. |
| 2006/0087903 A1 | 4/2006 | Riho et al. |
| 2006/0176744 A1 | 8/2006 | Stave |
| 2006/0262616 A1 | 11/2006 | Chen |
| 2007/0008799 A1 | 1/2007 | Dono et al. |
| 2007/0014174 A1 | 1/2007 | Ohsawa |
| 2007/0028068 A1 | 2/2007 | Golding et al. |
| 2007/0030746 A1 | 2/2007 | Best et al. |
| 2007/0033339 A1 | 2/2007 | Best et al. |
| 2007/0133330 A1 | 6/2007 | Ohsawa |
| 2007/0230264 A1 | 10/2007 | Eto |
| 2007/0237016 A1 | 10/2007 | Miyamoto et al. |
| 2007/0297252 A1 | 12/2007 | Singh |
| 2008/0028260 A1 | 1/2008 | Oyagi et al. |
| 2008/0031068 A1 | 2/2008 | Yoo et al. |
| 2008/0062742 A1 | 3/2008 | Wang |
| 2008/0126893 A1 | 5/2008 | Harrand et al. |
| 2008/0130394 A1 | 6/2008 | Dono et al. |
| 2008/0181048 A1 | 7/2008 | Han |
| 2008/0224742 A1 | 9/2008 | Pomichter |
| 2008/0253212 A1 | 10/2008 | Iida et al. |
| 2008/0266990 A1 | 10/2008 | Loeffler |
| 2008/0288720 A1 | 11/2008 | Atwal et al. |
| 2008/0301362 A1 | 12/2008 | Cavanna et al. |
| 2008/0313494 A1 | 12/2008 | Hummler et al. |
| 2008/0316845 A1 | 12/2008 | Wang et al. |
| 2009/0021999 A1 | 1/2009 | Tanimura |
| 2009/0059641 A1 | 3/2009 | Jeddeloh |
| 2009/0077571 A1 | 3/2009 | Gara et al. |
| 2009/0161457 A1 | 6/2009 | Wakimoto |
| 2009/0168571 A1 | 7/2009 | Pyo et al. |
| 2009/0185440 A1 | 7/2009 | Lee |
| 2009/0201752 A1 | 8/2009 | Riho et al. |
| 2009/0213675 A1 | 8/2009 | Shino |
| 2009/0251971 A1 | 10/2009 | Futatsuyama |
| 2009/0296510 A1 | 12/2009 | Lee et al. |
| 2010/0005217 A1 | 1/2010 | Jeddeloh |
| 2010/0005376 A1 | 1/2010 | Laberge et al. |
| 2010/0054011 A1 | 3/2010 | Kim |
| 2010/0074042 A1 | 3/2010 | Fukuda et al. |
| 2010/0080074 A1 | 4/2010 | Ohmaru et al. |
| 2010/0110809 A1 | 5/2010 | Kobayashi et al. |
| 2010/0110810 A1 | 5/2010 | Kobayashi |
| 2010/0131812 A1 | 5/2010 | Mohammad |
| 2010/0157693 A1 | 6/2010 | Iwai et al. |
| 2010/0182863 A1 | 7/2010 | Fukiage |
| 2010/0329069 A1 | 12/2010 | Ito et al. |
| 2011/0026290 A1 | 2/2011 | Noda et al. |
| 2011/0051530 A1 | 3/2011 | Kushida |
| 2011/0055495 A1 | 3/2011 | Remaklus, Jr. et al. |
| 2011/0069572 A1 | 3/2011 | Lee et al. |
| 2011/0122987 A1 | 5/2011 | Neyer |
| 2011/0216614 A1 | 9/2011 | Hosoe |
| 2011/0225355 A1 | 9/2011 | Kajigaya |
| 2011/0286271 A1 | 11/2011 | Chen |
| 2011/0310648 A1 | 12/2011 | Iwamoto et al. |
| 2011/0317462 A1 | 12/2011 | Gyllenhammer et al. |
| 2012/0014199 A1 | 1/2012 | Narui |
| 2012/0059984 A1 | 3/2012 | Kang et al. |
| 2012/0151131 A1 | 6/2012 | Kilmer et al. |
| 2012/0213021 A1 | 8/2012 | Riho et al. |
| 2012/0254472 A1 | 10/2012 | Ware et al. |
| 2013/0003467 A1 | 1/2013 | Klein |
| 2013/0003477 A1 | 1/2013 | Park et al. |
| 2013/0057173 A1 | 3/2013 | Yao et al. |
| 2013/0107623 A1 | 5/2013 | Kavalipurapu et al. |
| 2013/0173971 A1 | 7/2013 | Zimmerman |
| 2013/0254475 A1 | 9/2013 | Perego et al. |
| 2013/0279284 A1 | 10/2013 | Jeong |
| 2013/0304982 A1 | 11/2013 | Jung et al. |
| 2014/0006703 A1 | 1/2014 | Bains et al. |
| 2014/0006704 A1 | 1/2014 | Greenfield et al. |
| 2014/0013169 A1 | 1/2014 | Kobla et al. |
| 2014/0013185 A1 | 1/2014 | Kobla et al. |
| 2014/0050004 A1 | 2/2014 | Mochida |
| 2014/0078841 A1 | 3/2014 | Chopra |
| 2014/0078842 A1 | 3/2014 | Oh et al. |
| 2014/0078845 A1 | 3/2014 | Song |
| 2014/0089576 A1 | 3/2014 | Bains et al. |
| 2014/0095780 A1 | 4/2014 | Bains et al. |
| 2014/0095786 A1 | 4/2014 | Moon et al. |
| 2014/0119091 A1 | 5/2014 | You |
| 2014/0136763 A1 | 5/2014 | Li et al. |
| 2014/0143473 A1 | 5/2014 | Kim et al. |
| 2014/0177370 A1 | 6/2014 | Halbert |
| 2014/0177376 A1 | 6/2014 | Song |
| 2014/0189215 A1 | 7/2014 | Kang et al. |
| 2014/0189228 A1 | 7/2014 | Greenfield et al. |
| 2014/0219043 A1 | 8/2014 | Jones et al. |
| 2014/0237307 A1 | 8/2014 | Kobla et al. |
| 2014/0241099 A1 | 8/2014 | Seo et al. |
| 2014/0254298 A1 | 9/2014 | Dally |
| 2014/0269021 A1 | 9/2014 | Yang et al. |
| 2014/0281206 A1 | 9/2014 | Crawford et al. |
| 2014/0281207 A1 | 9/2014 | Mandava et al. |
| 2014/0292375 A1 | 10/2014 | Angelini et al. |
| 2014/0293725 A1 | 10/2014 | Best et al. |
| 2014/0317344 A1 | 10/2014 | Kim |
| 2014/0355332 A1 | 12/2014 | Youn et al. |
| 2014/0369109 A1 | 12/2014 | Lee et al. |
| 2014/0379978 A1 | 12/2014 | Kim et al. |
| 2015/0049567 A1 | 2/2015 | Chi |
| 2015/0055420 A1 | 2/2015 | Bell et al. |
| 2015/0078112 A1 | 3/2015 | Huang |
| 2015/0089326 A1 | 3/2015 | Joo et al. |
| 2015/0155027 A1 | 6/2015 | Abe et al. |
| 2015/0162067 A1 | 6/2015 | Kim et al. |
| 2015/0170728 A1 | 6/2015 | Jung et al. |
| 2015/0199126 A1 | 7/2015 | Jayasena et al. |
| 2015/0206572 A1 | 7/2015 | Lim et al. |
| 2015/0213872 A1 | 7/2015 | Mazumder et al. |
| 2015/0213877 A1 | 7/2015 | Darel |
| 2015/0228341 A1 | 8/2015 | Watanabe et al. |
| 2015/0243339 A1 | 8/2015 | Bell et al. |
| 2015/0255140 A1 | 9/2015 | Song |
| 2015/0262652 A1 | 9/2015 | Igarashi |
| 2015/0279441 A1 | 10/2015 | Greenberg et al. |
| 2015/0279442 A1 | 10/2015 | Hwang |
| 2015/0294711 A1 | 10/2015 | Gaither et al. |
| 2015/0340077 A1 | 11/2015 | Akamatsu |
| 2015/0356048 A1 | 12/2015 | King |
| 2016/0019940 A1 | 1/2016 | Jang et al. |
| 2016/0027498 A1 | 1/2016 | Ware et al. |
| 2016/0027531 A1 | 1/2016 | Jones et al. |
| 2016/0027532 A1 | 1/2016 | Kim |
| 2016/0042782 A1 | 2/2016 | Narui et al. |
| 2016/0078845 A1 | 3/2016 | Lin |
| 2016/0078911 A1 | 3/2016 | Fujiwara et al. |
| 2016/0078918 A1 | 3/2016 | Hyun et al. |
| 2016/0086649 A1 | 3/2016 | Hong et al. |
| 2016/0086651 A1 | 3/2016 | Kim |
| 2016/0093402 A1 | 3/2016 | Kitagawa et al. |
| 2016/0099043 A1 | 4/2016 | Tu |
| 2016/0111140 A1 | 4/2016 | Joo et al. |
| 2016/0125931 A1 | 5/2016 | Doo et al. |
| 2016/0133314 A1 | 5/2016 | Hwang et al. |
| 2016/0140243 A1 | 5/2016 | Adams et al. |
| 2016/0163372 A1 | 6/2016 | Lee |
| 2016/0172056 A1 | 6/2016 | Huh |
| 2016/0180917 A1 | 6/2016 | Chishti et al. |
| 2016/0180921 A1 | 6/2016 | Jeong |
| 2016/0196863 A1 | 7/2016 | Shin et al. |
| 2016/0202926 A1 | 7/2016 | Benedict |
| 2016/0211008 A1 | 7/2016 | Benedict et al. |
| 2016/0224262 A1 | 8/2016 | Mandava et al. |
| 2016/0225433 A1 | 8/2016 | Bains et al. |
| 2016/0225461 A1 | 8/2016 | Tuers et al. |
| 2016/0336060 A1 | 11/2016 | Shin |
| 2016/0343423 A1 | 11/2016 | Shido |
| 2017/0011792 A1 | 1/2017 | Oh et al. |
| 2017/0076779 A1 | 3/2017 | Bains et al. |
| 2017/0092350 A1 | 3/2017 | Halbert et al. |
| 2017/0117030 A1 | 4/2017 | Fisch et al. |
| 2017/0133085 A1 | 5/2017 | Kim et al. |

(56) References Cited

U.S. PATENT DOCUMENTS

| | | |
|---|---|---|
| 2017/0139641 A1 | 5/2017 | Cha et al. |
| 2017/0140611 A1 | 5/2017 | Joo |
| 2017/0140807 A1 | 5/2017 | Sun et al. |
| 2017/0148504 A1 | 5/2017 | Saifuddin et al. |
| 2017/0177246 A1 | 6/2017 | Miller et al. |
| 2017/0186481 A1 | 6/2017 | Oh et al. |
| 2017/0213586 A1 | 7/2017 | Kang et al. |
| 2017/0221546 A1 | 8/2017 | Loh et al. |
| 2017/0263305 A1 | 9/2017 | Cho |
| 2017/0287547 A1 | 10/2017 | Ito et al. |
| 2017/0323675 A1 | 11/2017 | Jones |
| 2017/0352399 A1 | 12/2017 | Yokoyama et al. |
| 2017/0371742 A1 | 12/2017 | Shim et al. |
| 2017/0372767 A1 | 12/2017 | Kang et al. |
| 2018/0005690 A1 | 1/2018 | Morgan |
| 2018/0025770 A1 | 1/2018 | Ito et al. |
| 2018/0025772 A1 | 1/2018 | Lee et al. |
| 2018/0060194 A1 | 3/2018 | Ryu et al. |
| 2018/0061483 A1 | 3/2018 | Morgan |
| 2018/0082737 A1 | 3/2018 | Lee |
| 2018/0084314 A1 | 3/2018 | Koyama |
| 2018/0090199 A1 | 3/2018 | Kim |
| 2018/0096719 A1 | 4/2018 | Tomishima |
| 2018/0102776 A1 | 4/2018 | Chandrasekar et al. |
| 2018/0107417 A1 | 4/2018 | Shechter et al. |
| 2018/0114561 A1 | 4/2018 | Fisch et al. |
| 2018/0114565 A1 | 4/2018 | Lee |
| 2018/0158504 A1 | 6/2018 | Akamatsu |
| 2018/0182445 A1 | 6/2018 | Lee et al. |
| 2018/0203621 A1 | 7/2018 | Ahn et al. |
| 2018/0218767 A1 | 8/2018 | Wolff |
| 2018/0261268 A1 | 9/2018 | Hyun et al. |
| 2018/0294028 A1 | 10/2018 | Lee et al. |
| 2018/0308539 A1 | 10/2018 | Ito et al. |
| 2018/0341553 A1 | 11/2018 | Koudele et al. |
| 2018/0366182 A1 | 12/2018 | Hyun et al. |
| 2019/0013059 A1 | 1/2019 | Akamatsu |
| 2019/0043558 A1 | 2/2019 | Suh et al. |
| 2019/0051344 A1 | 2/2019 | Bell et al. |
| 2019/0066759 A1 | 2/2019 | Nale |
| 2019/0066762 A1 | 2/2019 | Koya |
| 2019/0088315 A1 | 3/2019 | Saenz et al. |
| 2019/0088316 A1 | 3/2019 | Inuzuka et al. |
| 2019/0096492 A1 | 3/2019 | Cai et al. |
| 2019/0103147 A1 | 4/2019 | Jones et al. |
| 2019/0130961 A1 | 5/2019 | Bell et al. |
| 2019/0139599 A1 | 5/2019 | Ito et al. |
| 2019/0147941 A1 | 5/2019 | Qin et al. |
| 2019/0147964 A1 | 5/2019 | Yun et al. |
| 2019/0161341 A1 | 5/2019 | Howe |
| 2019/0172518 A1 | 6/2019 | Chen et al. |
| 2019/0196730 A1 | 6/2019 | Imran |
| 2019/0198078 A1 | 6/2019 | Hoang et al. |
| 2019/0198090 A1 | 6/2019 | Lee |
| 2019/0198099 A1 | 6/2019 | Mirichigni et al. |
| 2019/0205253 A1 | 7/2019 | Roberts |
| 2019/0207736 A1 | 7/2019 | Ben-tovim et al. |
| 2019/0228810 A1 | 7/2019 | Jones et al. |
| 2019/0228813 A1 | 7/2019 | Nale et al. |
| 2019/0228815 A1 | 7/2019 | Morohashi et al. |
| 2019/0237132 A1 | 8/2019 | Morohashi |
| 2019/0243708 A1 | 8/2019 | Cha et al. |
| 2019/0252020 A1 | 8/2019 | Rios et al. |
| 2019/0267077 A1 | 8/2019 | Ito et al. |
| 2019/0279706 A1 | 9/2019 | Kim |
| 2019/0333573 A1 | 10/2019 | Shin et al. |
| 2019/0348100 A1 | 11/2019 | Smith et al. |
| 2019/0348102 A1 | 11/2019 | Smith et al. |
| 2019/0348103 A1 | 11/2019 | Jeong et al. |
| 2019/0348107 A1 | 11/2019 | Shin et al. |
| 2019/0349545 A1 | 11/2019 | Koh et al. |
| 2019/0362774 A1 | 11/2019 | Kuramori et al. |
| 2019/0371391 A1 | 12/2019 | Cha et al. |
| 2019/0385661 A1 | 12/2019 | Koo et al. |
| 2019/0385667 A1 | 12/2019 | Morohashi et al. |
| 2019/0386557 A1 | 12/2019 | Wang et al. |
| 2020/0005857 A1 | 1/2020 | Ito et al. |
| 2020/0075106 A1 | 3/2020 | Tokutomi et al. |
| 2020/0082873 A1 | 3/2020 | Wolff |
| 2020/0090760 A1 | 3/2020 | Purahmad et al. |
| 2020/0135263 A1 | 4/2020 | Brown et al. |
| 2020/0194050 A1 | 6/2020 | Akamatsu |
| 2020/0194056 A1 | 6/2020 | Sakurai et al. |
| 2020/0201380 A1 | 6/2020 | Murali et al. |
| 2020/0202921 A1 | 6/2020 | Morohashi et al. |
| 2020/0211626 A1 | 7/2020 | Hiscock et al. |
| 2020/0211633 A1 | 7/2020 | Okuma |
| 2020/0211636 A1 | 7/2020 | Hiscock et al. |
| 2020/0251158 A1 | 8/2020 | Shore et al. |
| 2020/0294576 A1 | 9/2020 | Brown et al. |
| 2020/0302994 A1 | 9/2020 | Enomoto et al. |
| 2020/0321049 A1 | 10/2020 | Meier et al. |
| 2020/0349995 A1* | 11/2020 | Shore .................. G11C 11/4076 |
| 2020/0365208 A1 | 11/2020 | Schreck et al. |
| 2020/0381040 A1 | 12/2020 | Penney et al. |
| 2020/0395072 A1 | 12/2020 | Penney et al. |
| 2021/0005229 A1 | 1/2021 | Hiscock et al. |
| 2021/0005240 A1 | 1/2021 | Brown et al. |
| 2021/0020223 A1 | 1/2021 | Ayyapureddi et al. |
| 2021/0020262 A1 | 1/2021 | Penney et al. |
| 2021/0026732 A1 | 1/2021 | Park et al. |
| 2021/0057012 A1 | 2/2021 | Ayyapureddi et al. |
| 2021/0057013 A1 | 2/2021 | Jenkinson et al. |
| 2021/0057021 A1 | 2/2021 | Wu et al. |
| 2021/0065755 A1 | 3/2021 | Kim et al. |
| 2021/0065764 A1 | 3/2021 | Cheng et al. |
| 2021/0142852 A1 | 5/2021 | Schreck et al. |
| 2021/0158851 A1 | 5/2021 | Ayyapureddi |
| 2021/0158860 A1 | 5/2021 | Wu et al. |
| 2021/0158861 A1 | 5/2021 | Jeong et al. |
| 2021/0201984 A1 | 7/2021 | Khasawneh et al. |
| 2021/0225432 A1 | 7/2021 | Enomoto et al. |
| 2021/0241810 A1 | 8/2021 | Hollis et al. |
| 2021/0265504 A1 | 8/2021 | Ishizu et al. |
| 2021/0343324 A1 | 11/2021 | Brown et al. |
| 2021/0350844 A1 | 11/2021 | Morohashi et al. |
| 2021/0398592 A1 | 12/2021 | Penney et al. |
| 2021/0407583 A1 | 12/2021 | Penney et al. |
| 2022/0069992 A1 | 3/2022 | Ayyapureddi |
| 2022/0165347 A1 | 5/2022 | Pan |
| 2022/0230672 A1 | 7/2022 | Ayyapureddi et al. |
| 2022/0293166 A1 | 9/2022 | Ayyapureddi et al. |
| 2022/0415427 A1 | 12/2022 | Pan |
| 2023/0010619 A1 | 1/2023 | Ayyapureddi et al. |

FOREIGN PATENT DOCUMENTS

| | | |
|---|---|---|
| CN | 101038785 A | 9/2007 |
| CN | 101067972 A | 11/2007 |
| CN | 101331554 A | 12/2008 |
| CN | 101458658 A | 6/2009 |
| CN | 101622607 A | 1/2010 |
| CN | 102113058 A | 6/2011 |
| CN | 102483952 A | 5/2012 |
| CN | 104350546 A | 2/2015 |
| CN | 106710621 A | 5/2017 |
| CN | 107871516 A | 4/2018 |
| JP | H0773682 A | 3/1995 |
| JP | 2005-216429 A | 8/2005 |
| JP | 2011-258259 A | 12/2011 |
| JP | 4911510 B2 | 1/2012 |
| JP | 2013-004158 A | 1/2013 |
| KR | 20150002112 A | 1/2015 |
| KR | 20150002783 A | 1/2015 |
| KR | 20170058022 A | 5/2017 |
| KR | 1020180064940 A | 6/2018 |
| KR | 1020180085184 A | 7/2018 |
| KR | 20190048049 A | 5/2019 |
| WO | 2014120477 | 8/2014 |
| WO | 2015030991 A1 | 3/2015 |
| WO | 2017171927 A | 10/2017 |
| WO | 2019222960 A1 | 11/2019 |
| WO | 2020010010 A1 | 1/2020 |

(56) References Cited

FOREIGN PATENT DOCUMENTS

| WO | 2020191222 A1 | 9/2020 |
|---|---|---|
| WO | 2021003085 A1 | 1/2021 |
| WO | 2022108808 A1 | 5/2022 |

OTHER PUBLICATIONS

U.S. Appl. No. 17/932,206, titled, "Apparatuses and Methods for Dynamically Allocated Aggressor Detection", filed Sep. 14, 2022; pp. all pages of application as filed.
U.S. Appl. No. 17/822,033, titled, "Apparatuses and Methods for Tracking Word Line Accesses", filed Aug. 24, 2022, pp. all pages of application as filed.
U.S. Appl. No. 17/456,849 titled "Apparatuses, Systems, and Methods for Main Sketch and Slim Sketch Circuitfor Row Address Tracking", filed Nov. 29, 2021.
U.S. Appl. No. 17/565,119 titled "Apparatuses and Methods for Row Hammer Counter Mat", filed, Dec. 29, 2021.
U.S. Appl. No. 17/565,187 titled "Apparatuses and Methods for Row Hammer Counter Mat", filed Dec. 29, 2021.
U.S. Appl. No. 17/446,710 titled "Apparatuses, Systems and Methods for Determining Extremum Numericalvalues", filed Sep. 1, 2021.
U.S. Appl. No. 17/470,883 titled "Apparatuses and Methods for Tracking Victim Rows", filed Sep. 9, 2021.
Application No. PCT/US20/23689, titled "Semiconductor Device Having Cam That Stores Address Signals", dated Mar. 19, 2020, pp. all.
U.S. Appl. No. 15/884,192 entitled 'Semiconductor Device Performing Row Hammer Refresh Operation', filed Jan. 30, 2018, pp. all.
U.S. Appl. No. 16/797,658, titles "Apparatuses and Methods for Controlling Refresh Operations", filed Feb. 21, 2020, pp. all.
U.S. Appl. No. 16/818,981 titled "Apparatuses and Methods for Staggered Timing of Targeted Refresh Operations", filed Mar. 13, 2020, pp. all.
U.S. Appl. No. 16/824,460, titled "Semiconductor Device Performing Row Hammer Refresh Operation", dated Mar. 19, 2020, pp. all.
U.S. Appl. No. 16/025,844, titled "Apparatus and Methods for Triggering Row Hammer Address Sampling", filed Jul. 2, 2018, pp. all.
U.S. Appl. No. 16/783,063, titled "Apparatus and Methods for Triggering Row Hammer Address Sampling", dated Feb. 5, 2020, pp. all.
U.S. Appl. No. 16/805,197, titled "Apparatuses and Methods for Calculating Row Hammer Refresh Addresses in a Semiconductor Device", dated Feb. 28, 2020, pp. all.
U.S. Appl. No. 16/232,837, titled "Apparatuses and Methods for Distributed Targeted Refresh Operations", filed Dec. 26, 2018, pp. all.
U.S. Appl. No. 16/818,989, titled "Semiconductor Device Performing Row Hammer Refresh Operation", dated Mar. 13, 2020, pp. all.
U.S. Appl. No. 16/268,818, titled "Apparatuses and Methods for Managing Row Access Counts", filed Feb. 6, 2019, pp. all.
U.S. Appl. No. 16/286,187 titled "Apparatuses and Methods for Memory Mat Refresh Sequencing", filed Feb. 26, 2019; pp. all.
U.S. Appl. No. 16/084,119, titled "Apparatuses and Methods for Pure-Time, Self Adopt Sampling for Row Hammer Refresh Sampling", filed Sep. 11, 2018, pp. all.
U.S. Appl. No. 16/886,284 titled "Apparatuses and Methods for Access Based Refresh Timing", filed May 28, 2020, pp. all.
U.S. Appl. No. 16/886,284, titled "Apparatuses and Methods for Access Based Refresh Timing", dated May 28, 2020, pp. all.
U.S. Appl. No. 16/358,587, titled "Semiconductor Device Having Cam That Stores Address Signals", dated Mar. 19, 2019, pp. all.
U.S. Appl. No. 16/375,716 titled "Apparatuses and Methods for Staggered Timing of Targeted Refresh Operations", filed Apr. 4, 2019; pp. all.
U.S. Appl. No. 16/936,297 titled "Apparatuses and Methods for Managing Row Access Counts", filed Jul. 22, 2020, pp. all.
U.S. Appl. No. 16/411,573 titled "Apparatuses, Systems, and Methods for a Content Addressable Memory Cell", filed May 14, 2019, pp. all.
U.S. Appl. No. 16/428,625 titled "Apparatuses and Methods for Tracking Victim Rows", filed May 31, 2019, pp. all.
U.S. Appl. No. 16/513,400 titled "Apparatuses and Methods for tracking Row Accesses", filed Jul. 16, 2019, pp. all.
U.S. Appl. No. 17/060,403 titled "Apparatuses and Methods for Adjusting Victim Data", filed Oct. 1, 2020, pp. all.
U.S. Appl. No. 16/548,027 titled "Apparatuses, Systems, and Methods for Analog Row Access Rate Determination", filed Aug. 22, 2019, pp. all.
U.S. Appl. No. 16/549,942 titled "Apparatuses and Methods for Lossy Row Access Counting", filed Aug. 23, 2019, pp. all.
U.S. Appl. No. 16/546,152 titled "Apparatuses and Methods for Analog Row Access Tracking", filed Aug. 20, 2019, pp. all.
U.S. Appl. No. 16/549,411 titled "Apparatuses and Methods for Dynamic Refresh Allocation", filed Aug. 23, 2019, pp. all.
U.S. Appl. No. 16/655,110 titled "Apparatuses and Methods for Dynamic Targeted Refresh Steals", filed Oct. 16, 2019, pp. all.
U.S. Appl. No. 17/154,945 titled "Apparatuses, Systems, and Methods for a Content Addressable Memory Cell", filed Jan. 21, 2021, pp. all.
U.S. Appl. No. 17/170,616 titled "Apparatuses, Systems, and Methods for Analog Row Access Rate Determination", filed Feb. 8, 2021, pp. all.
U.S. Appl. No. 17/168,036 titled "Apparatuses and Methods for Analog Row Access Tracking", filed Feb. 4, 2021, pp. all.
U.S. Appl. No. 17/301,533 titled "Semiconductor Device Having Cam That Stores Address Signals", filed Apr. 6, 2021, pp. all.
International Application No. PCT/US19/40169 titled "Apparatus and Methods for Triggering Row Hammer Address Sampling", filed Jul. 1, 2019, pp. all.
International Application No. PCT/US19/64028, titled "Semiconductor Device Performing Row Hammer Refresh Operation", dated Dec. 2, 2019, pp. all.
International Application No. PCT/US20/26689, titled "Apparatuses and Methods for Staggered Timing of Targeted Refresh Operations", dated Apr. 3, 2020, pp. all.
International Application No. PCT/US20/40077, titled "Apparatuses and Methods for Monitoring Word Line Accesses", dated Jun. 29, 2020, pp. all.
U.S. Appl. No. 16/788,657, titled "Semiconductor Device Performing Row Hammer Refresh Operation", dated Feb. 12, 2020, pp. all.
U.S. Appl. No. 15/881,256 entitled 'Apparatuses and Methods for Detecting a Row Hammer Attack With a Bandpass Filter', filed Jan. 26, 2018, pp. all.
U.S. Appl. No. 16/425,525 titled "Apparatuses And Methods for Tracking All Row Accesses", filed May 29, 2019, pp. all.
U.S. Appl. No. 16/427,105 titled "Apparatuses And Methods for Priority Targeted Refresh Operations", filed May 30, 2019, pp. all.
U.S. Appl. No. 16/427,140 titled "Apparatuses And Methods for Tracking Row Access Counts Between Multiple Register Stacks", filed May 30, 2019, pp. all.
U.S. Appl. No. 16/437,811 titled "Apparatuses, Systems, And Methods for Determining Extremum Numerical Values", filed Jun. 11, 2019, pp. all.
U.S. Appl. No. 16/537,981 titled "Apparatuses and Methods for Controlling Targeted Refresh Rates", filed Aug. 12, 2019, pp. all.
U.S. Appl. No. 17/153,555 titled "Apparatuses and Methods for Dynamically Allocated Aggressor Detection", filed Jan. 20, 2021, pp. all.
U.S. Appl. No. 17/201,941 titled "Apparatuses and Methods for Sketch Circuits for Refresh Binning", filed Mar. 15, 2021, pp. all.
U.S. Appl. No. 17/375,817 titled "Apparatuses and Methods for Monitoring Word Line Accesses", filed Jul. 14, 2021, pp. all.
U.S. Appl. No. 17/443,056 titled "Apparatuses and Methods for Multiple Row Hammer Refresh Address Sequences", filed Jul. 20, 2021, pp. all.
U.S. Appl. No. 17/444,925 titled "Apparatuses and Methods for Countering Memory Attacks", filed Aug. 12, 2021, pp. all.

(56) References Cited

OTHER PUBLICATIONS

U.S. Appl. No. 15/789,897, entitled "Apparatus and Methods for Refreshing Memory", filed Oct. 20, 2017; pp. all.
U.S. Appl. No. 15/796,340, entitled: "Apparatus and Methods for Refreshing Memory", filed Oct. 27, 2017; pp. all.
U.S. Appl. No. 16/012,679, titled "Apparatuses and Methods for Multiple Row Hammer Refresh Address Sequences", filed Jun. 19, 2018; pp. all.
U.S. Appl. No. 16/112,471, titled "Semiconductor Device", filed Jun. 27, 2018; pp. all.
U.S. Appl. No. 16/112,471 titled "Apparatuses and Methods for Controlling Refresh Operations", filed Aug. 24, 2018; pp. all.
U.S. Appl. No. 16/160,801, titled "Apparatuses and Methods for Selective Row Refreshes", filed Oct. 15, 2018, pp. all.
U.S. Appl. No. 16/176,932, titled "Apparatuses and Methods for Access Based Refresh Timing", filed Oct. 31, 2018; pp. all.
U.S. Appl. No. 16/208,217, titled "Semiconductor Device Performing Row Hammer Refresh Operation", filed Dec. 3, 2018, pp. all.
U.S. Appl. No. 16/230,300, titled "Apparatuses and Methods for Staggered Timing of Targeted Refresh Operations", filed Dec. 21, 2018; pp. all.
U.S. Appl. No. 16/231,327 titled "Apparatuses and Methods for Selective Row Refreshes", filed Dec. 21, 2018; pp. all.
U.S. Appl. No. 16/237,291, titled "Apparatus and Methods for Refreshing Memory", filed Dec. 31, 2018, pp. all.
U.S. Appl. No. 16/290,730, titled "Semiconductor Device Performing Row Hammer Refresh Operation", filed Mar. 1, 2019; pp. all.
U.S. Appl. No. 16/374,623, titled "Semiconductor Device Performing Row Hammer Refresh Operation", filed Apr. 3, 2019; pp. ail.
U.S. Appl. No. 15/888,693 title "Semiconductor Device", filed May 14, 2019; pp. all.
U.S. Appl. No. 16/427,330 titled "Apparatuses and Methods for Storing Victim Row Data", filed May 30, 2019; pp. all.
U.S. Appl. No. 16/431,641 titled "Apparatuses and Methods for Controlling Steal Rates", filed Jun. 4, 2019; pp. all.
U.S. Appl. No. 16/682,606, titled "Apparatuses and Methods for Distributing Row Hammer Refresh Events Across a Memory Device", filed Nov. 13, 2019; pp. all.
U.S. Appl. No. 17/102,266, titled "Apparatuses and Methods for Tracking Word Line Accesses", dated Nov. 23, 2020; pp. all.
U.S. Appl. No. 15/876,566 entitled 'Apparatuses and Methods for Calculating Row Hammer Refresh Addresses in a Semiconductor Device', filed Jan. 22, 2018; pp. all.
International Application No. PCT/US20/32684, titled "Apparatuses, Systems, and Methods for Content Addressable Memory Cell", dated May 13, 2020; pp. all.
U.S. Appl. No. 15/656,084, titled "Apparatuses and Methods for Targeted Refreshing of Memory", filed Jul. 21, 2017; pp. all.
U.S. Appl. No. 16/459,520 titled "Apparatuses and Methods for Monitoring Word Line Accesses", filed Jul. 1, 2019, pp. all.
PCT Application No. PCT/US18/55821 "Apparatus and Methods for Refreshing Memory", filed Oct. 15, 2018, pp. all.
U.S. Appl. No. 15/715,846, entitled "Semiconductor Device", filed Sep. 26, 2017, pp. all.
U.S. Appl. No. 15/888,993, entitled "Apparatuses and Methods for Controlling Refresh Operations", filed Feb. 5, 2018, pp. all.
U.S. Appl. No. 16/190,627 titled "Apparatuses and Methods for Targeted Refreshing of Memory", filed Nov. 14, 2018, pp. all.
U.S. Appl. No. 16/459,507 titled "Apparatuses and Methods for Adjusting Victim Data", filed Jul. 1, 2019, pp. all.
U.S. Appl. No. 15/281,818, entitled: "Semiconductor Device", filed Sep. 30, 2016; pp. all.
U.S. Appl. No. 17/007,069, titled "Apparatuses and Methods for Providing Refresh Addresses", filed Aug. 21, 2020; pp. all.
Kim, et al., "Flipping Bits in MemoryWithout Accessing Them: An Experimental Study of DRAM Disturbance Errors", IEEE, Jun. 2014, 12 pgs.
Stout, Thomas et al., "Voltage Source Based Voltage-to-Time Converter", IEEE, downloaded Jul. 2020, pg. All.
[English Abstract] Zheng, Bin , et al., "Design of Built-in DRAM for TFT-LCD Driver Chip" LCD and display, Issue 4, Aug. 15, 2009; pp. all.

* cited by examiner

APPARATUSES AND METHODS FOR COUNTERING MEMORY ATTACKS

BACKGROUND

Information may be stored on individual memory cells of a memory as a physical signal (e.g., a charge on a capacitive element). The memory may be a volatile memory, and the physical signal may decay over time (which may degrade or destroy the information stored in the memory cells). It may be necessary to periodically refresh the information in the memory cells by, for example, rewriting the information to restore the physical signal to an initial value.

As memory components have decreased in size, the density of memory cells has greatly increased. Repeated access to a particular memory cell or group of memory cells (often referred to as a 'row hammer' attack) may cause an increased rate of data degradation in nearby memory cells. Some memories may identify addresses which are repeatedly accessed so that the nearby memory cells may be refreshed to avoid damage from row hammer attacks. As memory devices are developed to resist certain types of attacks, the memory devices may remain vulnerable to new and/or different types of attacks. Accordingly, continued advances in memory attack management are desirable.

DETAILED DESCRIPTION

Figure 1:
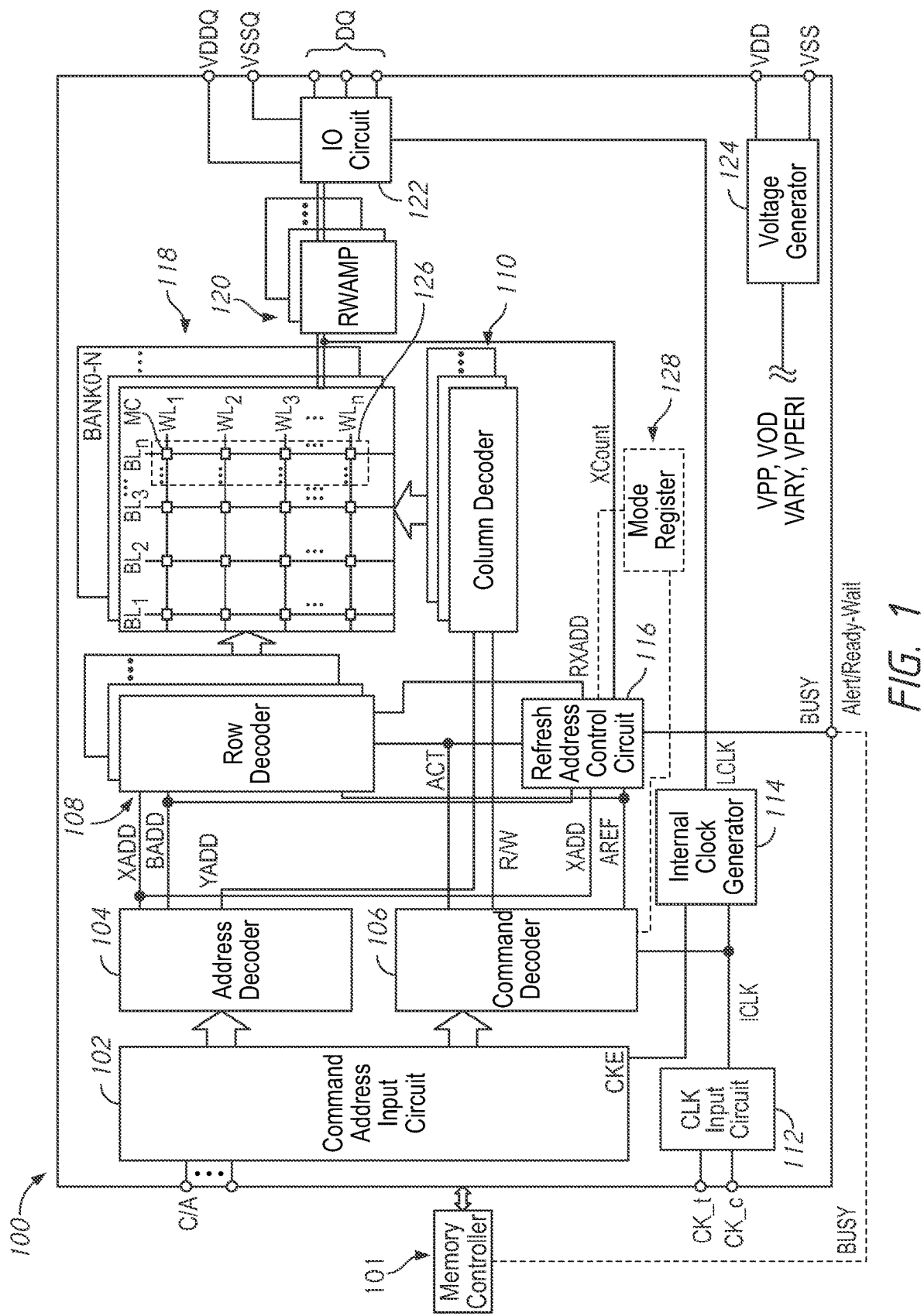
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Various patterns of access to the memory (generally referred to as attacks) may cause an increased rate of data degradation in one or more memory cells, such that they would decay before they can be refreshed as part of the auto-refresh operation. For example, repeated access to a particular row of memory (e.g., an aggressor row) may cause an increased rate of decay in rows (e.g., victim rows) which are close to the aggressor row. These repeated accesses may be part of a deliberate attack against the memory and/or may be due to 'natural' access patterns of the memory. The increased rate of decay in the victim rows may require that they be refreshed as part of a targeted refresh operation. The targeted refresh operations may be in addition to the auto refresh operations. The memory device may periodically perform targeted refresh operations. Additionally or alternatively, the memory device may perform one or more targeted refresh operations "as needed." That is, the targeted refresh operations may not be periodic (e.g., regularly scheduled). The targeted refresh operations may occur intermixed with auto-refresh operations. For example, the memory device may perform a set of refresh operations including a number of auto refresh operations, and a number of targeted refresh operations and then repeat this cycle. A memory device may generally cycle between performing access operations for a period of time, performing refresh operations for a period of time, performing access operations and so forth.

In some memory devices, the memory device may pause its "normal" operations of responding to commands from an external device (e.g., a memory controller) to perform the targeted refresh operations. During periods where the memory device performs targeted refresh operations, the memory device may activate (e.g., assert) a signal (e.g., a "busy" signal) on a pin, which may be referred to as a ready/wait pin or an alert pin. The signal provided to the pin may be received by the external device. Responsive to the active signal on the pin, the external device may stop providing commands to the memory device, sometimes referred to as a command bus stall. After the targeted refresh operations are completed, the memory device may deactivate the signal on the pin, and the external device may resume providing commands to the memory device. An example of a memory device with a pin for alerting an external device that the memory device is busy performing targeted refresh operations may be found in U.S. application Ser. No. 17/102,266 which is incorporated herein by reference for any purpose.

Memory devices may include circuitry for detecting aggressor rows and determining the corresponding victim rows to be refreshed during targeted refresh operations. When the circuitry determines that the row meets one or more criteria, the row may be determined to be an aggressor row. Victim rows of the aggressor row may then be determined and refreshed during targeted refresh operations. In some applications, a number of accesses to a row may be used to identify aggressor rows. When a number of accesses of a row reaches a threshold (e.g., threshold value) within a certain period of time, the memory device may determine the row is an aggressor row. However, certain memory attacks may take advantage of the use of a threshold. A memory attack may access a set of word lines to increase the number of accesses just below the threshold. Once several word lines have been accessed a number of times just below the threshold, the word lines may be accessed simultaneously, near simultaneously, or in quick succession. This may cause an overflow of a targeted refresh queue and/or the memory device to assert the ready/wait pin for an unacceptably long period of time as it refreshes all of the numerous victim rows. The unavailability of the memory device to respond to external commands during the targeted refresh operations may reduce performance of a system including the memory device and/or cause a malfunction of the system.

The present disclosure is directed to techniques for providing dynamic thresholds for detecting aggressor rows. In some embodiments, the dynamic threshold may be based, at least in part, on a random number provided by a random number generator. Comparing a number of accesses of a row to a dynamic threshold may reduce the occurrence of several word lines being detected as aggressors in a short period of time. Thus, the length of time the memory device is unavailable due to performing targeted refresh operations may remain within an acceptable time period.

While in general the present disclosure refers to determining aggressor and victim word lines and addresses, it should be understood that as used herein, an aggressor word line does not necessarily need to cause data degradation in neighboring word lines, and a victim word line does not necessarily need to be subject to such degradation. A memory may use some criteria to judge whether an address is an aggressor address, which may capture potential aggressor addresses rather than definitively determining which addresses are causing data degradation in nearby victims. Similarly, victim addresses may be determined based on which word lines are expected to be effected by aggressors, rather than a definitive determination of which word lines are undergoing an increased rate of data decay.

FIG. 1 is a block diagram of a semiconductor device according to at least one embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including N+1 memory banks BANK0-BANKN, where N is a whole number. The memory array 118 may include any number of banks (e.g., 1, 4, 8, 16). Each memory bank includes multiple word lines WL (rows), multiple bit lines BL and/BL (columns), and multiple memory cells MC arranged at intersections of the plurality of word lines WL and the plurality of bit lines BL and/BL.

In some embodiments, such as the one shown in FIG. 1, some of the memory cells MC along the word lines may be counter memory cells 126. The counter memory cells 126 may be positioned at the intersection of counter bit lines and the word lines. There may be multiple counter memory cells 126 along a given word line, and collectively the values stored in the counter memory cells 126 may represent a respective access count XCount of the word line (e.g., a number of times the word line has been activated). A data bus associated with the counter memory cells 126 may be coupled to the refresh address control circuit 116. The data bus associated with the counter memory cells 126 may be separate from the data bus which couples the other memory cells to the 10 circuit 122.

The selection of the word line WL is performed by a row decoder circuit 108 and the selection of the bit lines BL is performed by a column decoder 110. In the embodiment of FIG. 1, the row decoder circuit 108 includes a respective row decoder for each memory bank and the column decoder circuit 110 includes a respective column decoder for each memory bank. The bit lines BL are coupled to a respective sense amplifier (SAW). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL. Information may generally be read from and written to the counter memory cells 126 in an analogous fashion, except that the data in the counter memory cells 126 are read and written by the refresh address control circuit 116.

The semiconductor device 100 may employ a plurality of external terminals that include command and address (C/A) terminals coupled to a command and address bus to receive commands and addresses, and a CS signal, clock terminals to receive clocks CK_t and CK_c, data terminals DQ to provide data, and power supply terminals to receive power supply potentials VDD, VSS, VDDQ, and VSSQ.

The clock terminals are supplied with external clocks CK_t and CK_c that are provided to an input circuit 112. The external docks may be complementary. The input circuit 112 generates an internal clock ICLK based on the CK_t and clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder circuit 104. The address decoder circuit 104 receives the address and supplies a decoded row address XADD to the row decoder circuit 108 and supplies a decoded column address YADD to the column decoder circuit 110. The address decoder circuit 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed. In some embodiments, the commands and/or addresses may be provided by a component external to the device 100, for example, as shown in FIG. 1, a memory controller 101 in communication with the device 100.

The received commands may be provided as internal command signals to a command decoder circuit 106 via the command/address input circuit 102. The command decoder circuit 106 includes circuits to decode the internal command signals to generate various internal signals and commands for performing operations. For example, the command decoder circuit 106 may provide a row command signal to select a word line and a column command signal to select a bit line.

The device 100 may receive an access command which is a row activation command ACT. When the row activation command ACT is received, a bank address BAUD and a row address XADD are timely supplied with the row activation command ACT.

The device 100 may receive access commands for performing read operations. When the commands are received, and a bank address, a row address and a column address are timely supplied with the commands, read data is read from memory cells MC in the memory, array 118 corresponding to the row address and column address. The commands are received by the command decoder circuit 106, which provides internal commands so that read data from the memory array 118 is provided to the read/write amplifiers 120. The read data is output to outside from the data terminals DQ via the input/output circuit 122.

The device 100 may receive access commands for performing write operations. When the commands are received, and a bank address, a row address and a column address are timely supplied with the commands, write data supplied to the data terminals DQ is written to a memory cells in the memory array 118 corresponding to the row address and column address. The commands are received by the command decoder circuit 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 to the read/write amplifiers 120, and by the read/write amplifiers 120 to the memory array 118 to be written into the memory cell MC.

The device 100 may also receive commands causing it to carry out one or more refresh operations as part of a self-refresh mode. The device 100 may be periodically placed in a refresh mode. Thus, refresh operations may be performed periodically each time the memory device is in the refresh mode. In some embodiments, the refresh mode command may be externally issued to the memory device 100, such as by memory controller 101. In some embodiments, the refresh mode command may be periodically generated by a component of the device 100. In some embodiments, when an external signal indicates a refresh mode entry command (e.g., an external refresh command), the refresh signal AREF may also be activated. The refresh signal AREF may be a pulse signal which is activated when the command decoder circuit 106 receives a signal which indicates entry to the self-refresh mode. The refresh signal AREF may be activated once immediately after command input, and thereafter may be cyclically activated at desired internal timing. In some embodiments, the refresh signal AREF may cause more than one refresh operation to be performed, which may be referred to as a "multi pump" refresh. In some embodiments, the refresh signal AREF may be active during the refresh mode. In some embodiments, the refresh signal AREF may be active during the multiple refresh operations. The refresh signal AREF may be used to control the timing of refresh operations during the refresh mode. A self-refresh exit command may cause the automatic activation of the refresh signal AREF to stop and may cause the device 100 to return to an idle state and/or resume other operations.

The refresh signal AREF is supplied to the refresh control circuit 116. The refresh control circuit 116 supplies a refresh row address RXADD to the row decoder circuit 108, which may refresh one or more word lines WL indicated by the refresh row address RXADD. In some embodiments, the refresh address RXADD may represent a single word line. In some embodiments, the refresh address RXADD may represent multiple word lines, which may be refreshed sequentially or simultaneously by the row decoder circuit 108. In some embodiments, the number of word lines represented by the refresh address RXADD may vary from one refresh address to another. The refresh control circuit 116 may control a timing of the refresh operation, and may generate and provide the refresh address RXADD. The refresh control circuit 116 may be controlled to change details of the refreshing address RXADD (e.g., how the refresh address is calculated, the timing of the refresh addresses, the number of word lines represented by the address), or may operate based on internal logic.

The refresh control circuit 116 may selectively output a targeted refresh address (e.g., which specifies one or more victim addresses based on an aggressor) or an automatic refresh address (e.g., from a sequence of auto refresh addresses) as the refresh address RXADD. Based on the type of refresh address RXADD, the row decoder circuit 108 may perform a targeted refresh or auto refresh operation. The automatic refresh addresses may be from a sequence of addresses which are provided based on activations of the refresh signal AREF and/or pumps generated responsive to AREF. The refresh control circuit 116 may cycle through the sequence of auto refresh addresses at a rate determined by AREF. In some embodiments, the auto refresh operations may generally occur with a timing such that the sequence of auto refresh addresses is cycled such that no information is expected to degrade in the time between auto refresh operations for a given word line. In other words, auto refresh operations may be performed such that each word line is refreshed at a rate faster than the expected rate of information decay.

The refresh address control circuit 116 may also determine targeted refresh addresses which are addresses that require refreshing victim addresses corresponding to victim rows) based on the access pattern of nearby addresses (e.g., aggressor addresses associated with aggressor rows) in the memory array 118. The refresh address control circuit 116 may monitor accesses to the different word lines WL of the memory bank. As described in U.S. Pat. No. 10,770,127, which is incorporated herein by reference for any purpose, when the row decoder circuit 108 sends an access command to a particular row, the information in the counter memory cells 126 along that row may be read to the refresh address control circuit 116 as the access count Xcount. The refresh address control circuit 116 may determine an access count of the row based on the values stored in the counter memory cells 126 of the accessed row.

The refresh address control circuit 116 may determine if the accessed row is an aggressor row based on the access count from the counter memory cells 126. In some embodiments, the refresh control circuit 116 may compare the access count value XCount to a threshold value. Based on the comparison, the refresh control circuit 116 may determine whether the current row is an aggressor row. For example, if the access count value XCount is equal to or above the threshold value, the current row may be determined to be an aggressor row.

According to embodiments of the present disclosure, rather than being a static value, the threshold value may be a random number (as used herein, random collectively refers to "truly" random, quasi-random, and pseudorandom). In some embodiments, the refresh address control circuit 116 may generate a random number as the threshold value each time an activation ACT command is received. In some embodiments, the random number is a number generated within a defined range (e.g., 1,000-2,000). In some embodiments, the threshold value may be a combination of a fixed number and a randomly generated offset. For example, the fixed number may be 1,000 and the offset is a random number between 50 and +50 and the threshold value is the sum of the fixed number and the offset. The numbers and ranges provided herein are merely exemplary and other numbers and ranges may be used in other embodiments. The numbers and ranges selected for the threshold value may be based on one or more factors such as word line density, system criticality, and/or materials used for the memory cells MC. In some embodiments, the range of the random number, the range of the offset, and/or the fixed number may be hardwired in the device 100. In some embodiments, these values may be programmable values stored in the device 100. For example, the range of the random number, the range of the offset, and/or the fixed number may be stored in a mode register 128 and written to the mode register with a mode register write command. The mode register 128 may then provide the programmed values to the refresh control circuit 116.

Returning to the determination made by the refresh address control circuit 116, the current row is not an aggressor row, the value of the access count may be changed and then the refresh address control circuit may write the new value of the access count back to the counter memory cells 126 of the accessed row. If the refresh address control circuit 116 determines that the accessed row is an aggressor, then the refresh address control circuit 116 may use the row address XADD of the accessed row to determine one or more victim row addresses and provide them as a refresh address RXADD as part of a targeted refresh operation. When the accessed row is determined to be an aggressor, the access count Xcount associated with that row may be reset (e.g., to a minimum value, such as 0). In some embodiments, the refresh address control circuit 116 may queue up identified aggressor addresses (e.g., in a register) for later use in targeted refresh operations. The refresh address RXADD may be provided with a timing based on a timing of the refresh signal AREF.

The refresh control circuit 116 may use multiple methods to determine the timing of targeted refresh operations. In some embodiments, the refresh control circuit 116 may have periodic targeted refresh operations during a refresh mode, where the refresh control circuit 116 performs auto refresh operations and targeted refresh operations (e.g., by providing a targeted refresh address as the refresh address RXADD) based on a periodic schedule. For example, after entering a refresh mode, the refresh control circuit 116 may perform a certain number of auto refresh operations, and then perform a certain number of targeted refresh operations.

In some embodiments, the refresh control circuit 116 may perform targeted refresh operations responsive to determining an accessed row is an aggressor row. Targeted refresh operations performed responsive to the detected aggressor row may be in addition to or instead of periodic targeted refresh operations. In some embodiments, the targeted refresh operations responsive to the detection of the aggressor row may be performed outside of a regularly scheduled refresh mode. In some embodiments, the refresh control circuit 116 may activate (e.g., assert) a busy signal BUSY, which may be provided to an external pin of device 100, such as an alert pin ALERT and/or Ready-Wait pin. The busy signal BUSY may be received by an external device, such as the memory controller 101, via the external pin. The busy signal BUSY may notify the external device that the device 100 is performing targeted refresh operations and is not available to perform access operations. In some embodiments, responsive to the active busy signal BUSY, the memory controller 101 may pause (e.g., delay) providing further access commands and/or other commands to the device 100. In some embodiments, the memory controller 101 may cancel one or more queued commands responsive to the active busy signal BUSY. Once the targeted refresh operations have been completed, the refresh control circuit 116 may deactivate the busy signal BUSY. The memory controller 101 may resume providing commands to the device 100 responsive to the deactivated busy signal BUSY.

The power supply terminals are supplied with power supply potentials VDD and VSS. The power supply potentials VDD and VSS are supplied to an internal voltage generator circuit 124. The internal voltage generator circuit 124 generates various internal potentials VPP, VOD, VARY, VPERI, and the like based on the power supply potentials VDD and VSS supplied to the power supply terminals. The internal potential VPP is mainly, used in the row decoder 108, the internal potentials VOD and VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply, terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
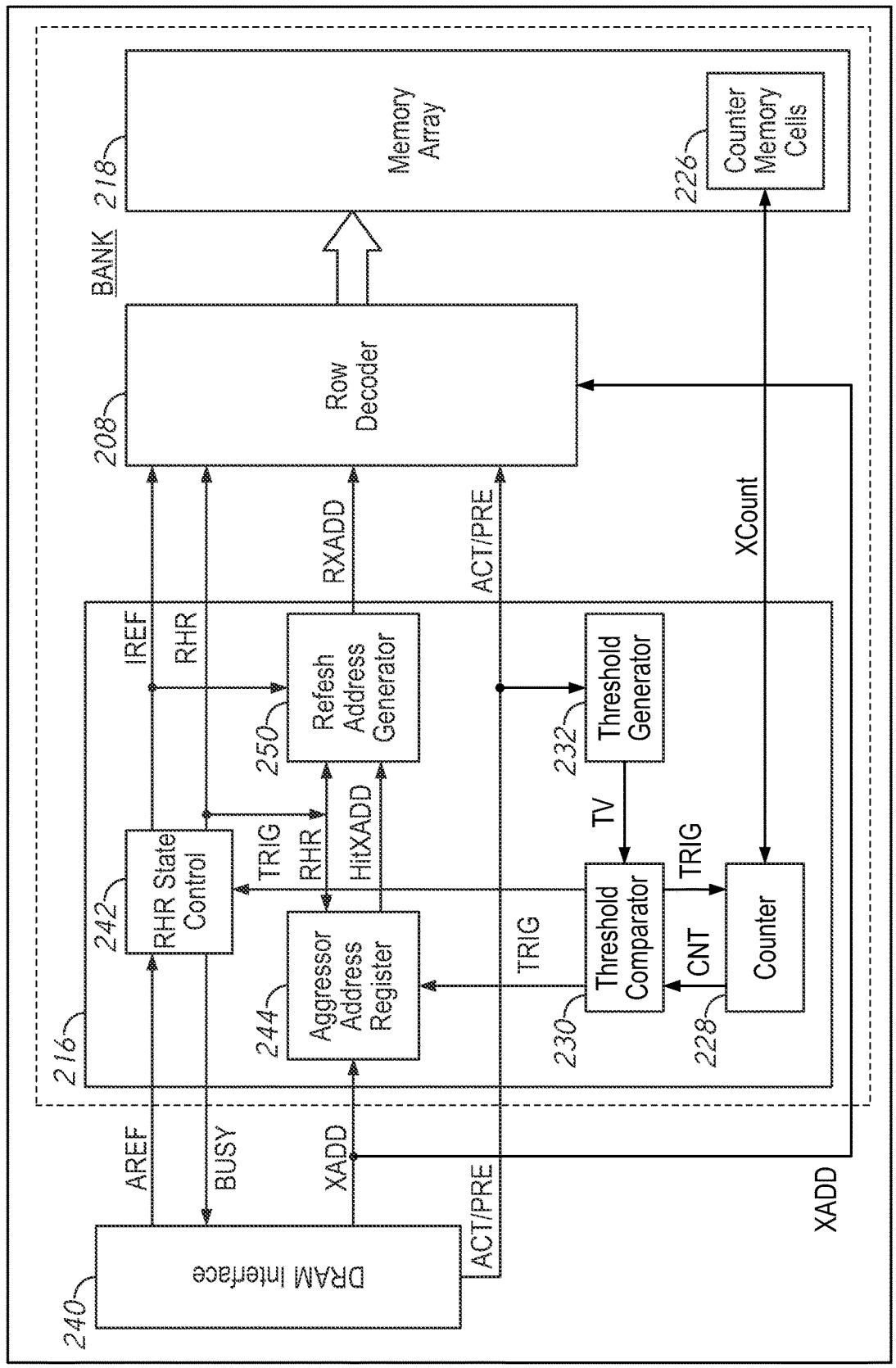
FIG. 2 is a block diagram of a refresh address control circuit according to an embodiment of the present disclosure.

FIG. 2 is a block diagram of a refresh control circuit according to an embodiment of the present disclosure. For context, a row decoder 208, a DRAM interface 240, and a memory array 218 are also shown. In some embodiments, the refresh control circuit 216 may be used to implement the refresh control circuit 116 of FIG. 1. Similarly, the row decoder 208 may be used to implement the row decoder circuit 108, and the memory array 218 may be used to implement memory array 118 of FIG. 1. Certain internal components and signals of the refresh control circuit 216 are shown to illustrate the operation of the refresh control circuit 216. The dotted line around the refresh control circuit 216, the row decoder 208, and the memory array 218 is shown to represent that in certain embodiments, each of the components within the dotted line may correspond to a particular bank of memory (e.g., memory banks BANK0-N of memory array 118), and that these components may be repeated for each of the banks of memory. In some embodiments, the components shown within the dotted line may be associated with each of the memory banks. Thus, there may be multiple refresh control circuits 216 and row decoders 208. For the sake of brevity, components for only a single bank will be described.

A DRAM interface 240 may provide one or more signals to the address refresh control circuit 216 and row decoder 208 which in turn (along with a column decoder, not shown) may perform access operations on the memory array 218. The DRAM interface 240 may represent one or more components which provides signals to components of the bank. In some embodiments, the DRAM interface 240 may include a memory controller coupled to the semiconductor memory device (e.g., memory controller 101). In some embodiments, the DRAM interface 240 may represent one or more components of a semiconductor device (e.g., device 100) such as the command address input circuit 102, the address decoder 104, and/or the command decoder circuit 106 of FIG. 1. The DRAM interface 240 may provide a row address XADD, the auto-refresh signal AREF, an activation signal ACT, and a, precharge signal Pre. The auto-refresh signal AREF may be a periodic signal which may indicate when an auto-refresh operation is to occur. The activation signal ACT may be provided to activate a given bank of the memory. The precharge signal Pre may be provided to precharge the given bank of the memory. The row address XADD may be a signal which specifies one or more particular word lines of the memory array 218, and may be a signal including multiple bits (which may be transmitted in series or in parallel).

In some embodiments, the refresh control circuit 216 may include a counter circuit 228, a threshold comparator circuit 230, a threshold generator circuit 232, an RHR state control circuit 242, an aggressor address register 244, and a refresh address generator 250.

The counter circuit 228 may be coupled to the memory array 218, particularly, to the count value memory cells 226 of the memory array 218. The count value memory cells 226 may be used to implement the count value memory cells 126 in some embodiments. When a word line of the memory array 218 is accessed, the value XCount of the count value memory cells 226 along that word line are read to the counter circuit 228. The counter circuit 228 may determine a value of the access count for that row based on the value(s) read from the count value memory cells 226. The counter circuit 228 may provide the access count CNT to the threshold comparator circuit 230.

The threshold comparator circuit 230 may compare the access count CNT to a threshold value. Based on the comparison, the threshold comparator circuit 230 may activate a trigger signal TRIG that is provided to the counter circuit 228, the aggressor address register 244, and/or the REM state control circuit 342. For example, the threshold comparator circuit 230 may determine if the value of the access count CNT for the word line exceeds the threshold value (e.g., if the value is greater than the threshold value) or is equal to a threshold value. If the value is not equal to or does not exceed the threshold (e.g., if the value is less than the threshold), then the threshold comparator circuit 230 may not activate the trigger signal TRIG. Responsive to the inactive (e.g., unasserted) TRIG, the counter circuit 228 may update (e.g, change) a value of the access count CNT and write the updated count XCount hack to the count value memory cells 226. Updating the count may include incrementing or decrementing the count in some embodiments.

If the threshold comparator circuit 230 determines the count value CNT does equal or exceed the threshold, then the current address XADD may be determined to be an aggressor address. If the current address XADD is an aggressor address, TRIG may be activated. Responsive to the active TRIG, the aggressor address register 244 may record (e.g., latch) the current value of the row address XADD. In some embodiments, the active TRIG may further cause the RHR state control circuit 342 to trigger a targeted refresh operation. Further in response to the active TRIG, the counter circuit 228 may reset a value of the count, for example, by writing an initial value of the count (e.g., 0) back to the count value memory cells 226.

In some embodiments, the threshold comparator circuit 230 may receive the threshold value TV from a threshold generator circuit 232. The threshold generator circuit 232 may receive the activation signal ACT from the DRAM interface 240. Responsive to the ACT signal, the threshold generator circuit 232 may generate the threshold value TV provided to the threshold comparator circuit 230. Other signals may be used instead of or in addition to the ACT signal to generate a new random number. For example, the refresh signal AREF, an internal clock signal and/or a signal from an oscillator circuit included in the memory device may be used. In some embodiments, the threshold value TV may be a random number within a desired rage of values (e.g., 1,000-2,000). In some embodiments, the threshold value TV may be a fixed number (e.g., 1,500) combined with a randomly generated offset (e.g., −100 to +100).

The RHR state control circuit 242 may receive the AREF signal from the DRAM interface and the TRIG signal from the threshold comparator circuit 230. The MIR state control circuit 242 may provide an active signal RHR to indicate that a targeted refresh operation, such as a row hammer refresh (e.g., a refresh of the victim rows corresponding to an identified aggressor row) should occur. In some embodiments, the RHR state control circuit 242 may further provide a BUSY signal to the DRAM interface 240 to indicate performance of the targeted refresh operation. The MIR state control circuit 242 may also provide an active internal refresh signal IREF, to indicate that an auto-refresh operation should occur. The auto-refresh signal AREF may be periodically activated and may be used to control the timing of refresh operations. In some embodiments, the signals RHR and IREF may be activated such that they are not active at the same time (e.g., are not both at a high logic level at the same time).

The memory device may carry out a sequence of auto-refresh operations in order to periodically refresh the rows of the memory device. The RHR signal may be activated in order to indicate that the device should refresh a particular targeted row (e.g., a victim row) instead of an address from the sequence of auto-refresh addresses. The MK state control circuit 242 may use internal logic to provide the active RHR signal. For example, in some embodiments, the RHR state control circuit 242 may provide the active RHR signal based on certain number of activations of AREF (e.g., every 4th activation of AREF). Additionally or alternatively, the RHR state control circuit 242 may activate the RHR signal responsive to receiving an active TRIG signal from the threshold comparator circuit 230. In some embodiments, the active TRIG may trigger the refresh control circuit 216 to cause a targeted refresh operation to be performed outside the time period of a regularly scheduled refresh operation.

In some embodiments, the RHR state control circuit 242 may activate the BUSY signal during targeted refresh operations. In some embodiments, the BUSY signal may be activated when the RHR signal is activated. In some embodiments, the BUSY signal may be activated only when the RHR signal is activated outside a regularly scheduled refresh period and/or when the TRIG signal is activated. The active BUSY signal may notify other components of the semiconductor device including the refresh control circuit 216 or a component in communication with the device (e.g., a memory controller) that the memory array 218 is unavailable for access operations. In some embodiments, the BUSY signal may be provided to an externally available pin of a semiconductor device including the refresh control circuit 216 (e.g., an alert pin). When the targeted refresh operation is completed, the RHR state control circuit 242 may deactivate the BUSY signal.

Responsive to an activation of RHR, the aggressor address register 244 may provide an aggressor address HitXADD, and the refresh address generator 250 may provide a refresh address RXADD, which may be one or more victim addresses associated with HitXADD (e.g., row addresses of victim rows of the identified aggressor row). Responsive to IREF, the refresh address generator 250 may provide an auto-refresh address as the refresh address RXADD. The row decoder 208 may perform a refresh operation responsive to the refresh address RXADD and the targeted refresh signal RHR. The row decoder 208 may perform an auto-refresh operation based on the refresh address RXADD and the internal refresh signal IREF.

The aggressor address register 244 may store one or more row addresses which have been identified as aggressor addresses by the threshold comparator circuit 230. Responsive to the active TRIG from the threshold comparator circuit 230, the aggressor address register 244 may store the current row address XADD which is being accessed. The aggressor address register 244 may provide the stored address as a match address HitXADD to the refresh address generator 250, which may calculate one or more victim addresses associated with the match address HitXADD. In some embodiments, the aggressor address register 244 may be a latch circuit which stores a single address. In some embodiments, the aggressor address register 244 may be a buffer which stores multiple addresses, and provides the first stored address as the match address HitXADD. The aggressor address register 244 may switch to a next address in the register after the victim row(s) associated with the first address have been refreshed.

The refresh address generator 250 may receive the targeted refresh signal RHR and the match address HitXADD. The match address HitXADD may represent an aggressor row. The refresh address generator 250 may determine the locations of one or more victim rows based on the match address HitXADD and provide them as the refresh address RXADD. In some embodiments, the victim rows may include rows which are physically, adjacent to the aggressor row or rows (e.g., HitXADD+1 and HitXADD−1). Other physical relationships between victim rows and the identified aggressor rows may also or alternatively be used in other examples.

The refresh address generator 250 may determine the value of the refresh address RXADD based on the targeted refresh signal RHR and the internal auto-refresh signal IREF. In some embodiments, when the signal IREF is active, the refresh address generator 250 may provide one of a sequence of auto refresh addresses. When the signal RHR is active, the refresh address generator 250 may provide a targeted refresh address, such as a victim address, as the refresh address RXADD. In some embodiments, multiple targeted refresh addresses may be provided for a refresh operation.

The row decoder 208 may perform one or more operations on the memory array 218 based on the received signals and addresses. For example, responsive to the activation signal ACT and the row address XADD (and IREF and RHR being inactive), the row decoder 208 may direct one or more access operations (for example, a read operation) on the specified row address XADD. Responsive to the RHR signal being active, the row decoder 208 may refresh the refresh address RXADD. In some embodiments, the counter circuit 228 may increment the access count stored in the count value memory cells 226 responsive to a refresh operation of a given row. In some embodiments, the counter circuit 228 may not increment the access count responsive to a refresh operation.

If an attack caused several of the access count values XCount in the counter memory cells 226 to increase up to a similar value, it is unlikely that several of the word lines would trigger the threshold comparator 230 in a short period of time because the threshold value is dynamic rather than static. It is likely some of the word lines will trigger the threshold comparator 230 sooner and other word lines will trigger the threshold comparator 230 later based on the access count values as the threshold value varies each time. In some applications, this may prevent the aggressor address register 344 from "overflowing" and/or requiring the RHR state control circuit 342 to assert the BUSY signal for an unacceptably long period of time.

Figure 3:
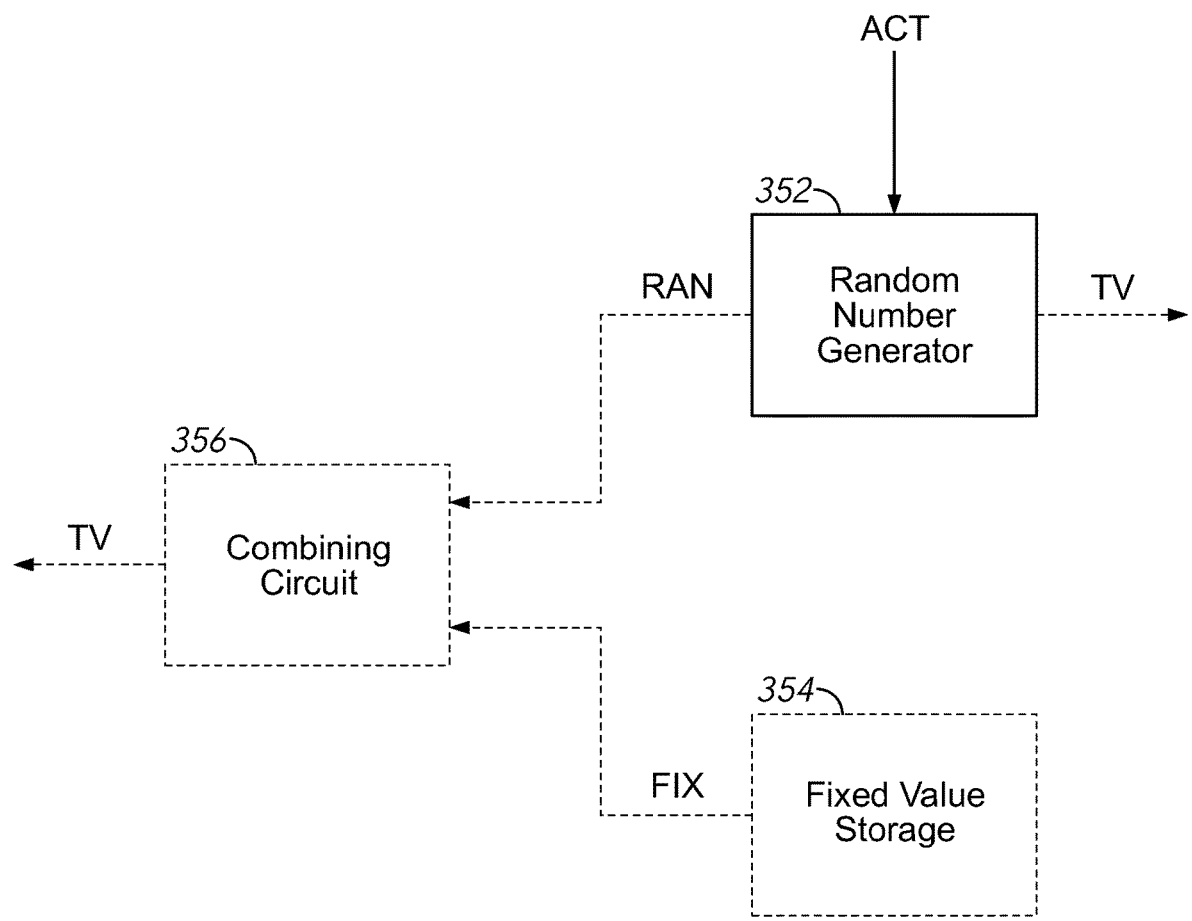
FIG. 3 is a block diagram of a threshold generator circuit according to an embodiment of the present disclosure.

FIG. 3 is a block diagram of a threshold generator circuit according to an embodiment of the present disclosure. In some embodiments, the threshold generator circuit 332 may be used to implement the threshold generator circuit 232 of FIG. 2. In some embodiments, the threshold generator circuit 332 may include a random number generator circuit 352. Optionally, the threshold generator circuit 332 may include a fixed value storage circuit 354 and a combining circuit 356.

The random number generator circuit 352 may provide a random number responsive to activation of an activation signal ACT. In some embodiments, the random number generator circuit 352 may provide the random number as a threshold value TV. The threshold value may be received by a threshold comparator circuit, such as threshold comparator circuit 230 shown in FIG. 2. In some embodiments, the random number generator circuit 352 may provide a random number within a desired range (e.g., −50 to +50, 2,000 to 3,000). In some embodiments, in addition to or instead of a fixed range, the range may be defined, at least in part, by a mean and/or standard deviation. The range may be set (e.g., hardwiring, fuse blowing, anti-fuses) or programmable (e.g., programmable latch or register, such as mode register 128).

Any suitable random number generator now known or developed in the future may be used to implement the random number generator circuit 352. Examples include, but are not limited to, linear feedback shift registers, random cycle bit generators, and squares random number generators.

In some embodiments, the random number provided by the random number generator circuit 352 may be provided as an output random number RAN to a combining circuit 356. The combining circuit 356 may further receive a fixed value FIX from the fixed value storage circuit 354. In some embodiments, the combining circuit 356 may combine the random number RAN and the fixed value FIX to provide the threshold value TV. The threshold value TV may be provided to the threshold comparator circuit from the combining circuit 356 rather than from the random number generator circuit 352. In some embodiments, the combining circuit 356 may sum RAN and FIX to provide TV. In some embodiments, the combining circuit 356 may take an average of RAN and FIX to provide TV. In some embodiments, the combining circuit 356 may multiply RAN and FIX to provide TV. The circuitry for performing such arithmetic operations are well known in the art and will not be provided herein.

The fixed value storage circuit 354 may be any suitable storage circuit for storing a fixed value of a desired magnitude. Suitable circuits include, but are not limited to, latches and registers. The fixed value FIX may be set (e.g., hardwiring, fuse blowing, anti-fuses) or programmable (e.g., programmable latch or register, such as mode register 128) in the fixed value storage circuit 354. The numbers and ranges selected for the random number RAN and fixed value FIX may be based on one or more factors such as word line density, system criticality, and/or materials used in a memory device.

Figure 4:
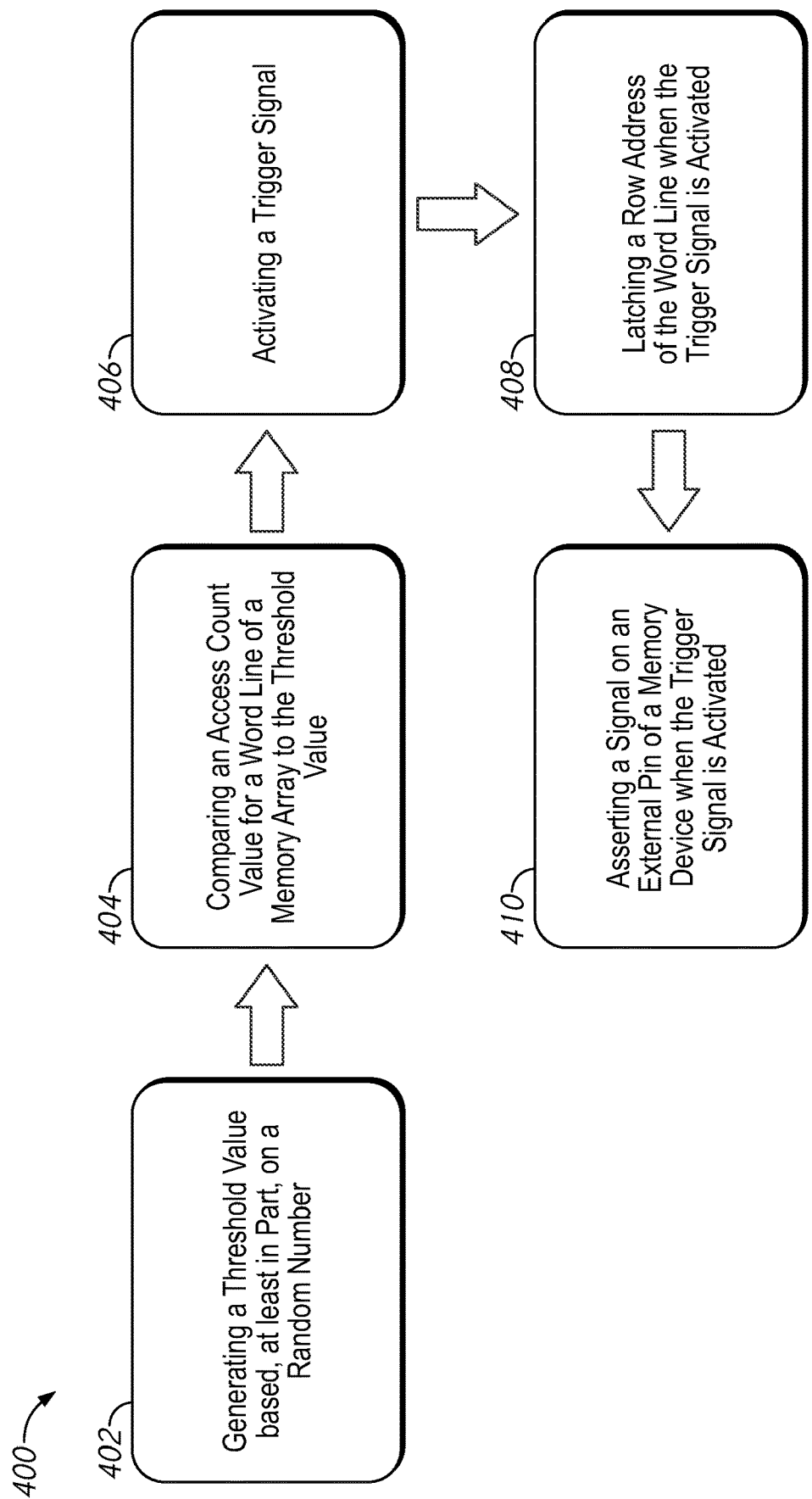
FIG. 4 is a flow chart of a method according to an embodiment of the present disclosure.

FIG. 4 is a flow chart of a method according to an embodiment of the present disclosure. In some embodiments, the method 400 may be performed in whole or in part by a refresh control circuit, such as refresh control circuit 116 and/or 216. While the method 400 will be described with reference to refresh control circuit 216, the method 400 is not limited to the specific refresh control circuit shown in FIG. 2.

At block 402, "generating a threshold value based, at least in part, on a random number" may be performed. In some embodiments, the threshold value may be generated by threshold generator circuit 232 and/or 332. In some embodiments, generating the threshold value may include generating a random number and combining the random number with a fixed value. The random number may be generated by a random number generator circuit, such as random number generator circuit 352. In some embodiments, the fixed value may be stored in a storage circuit, such as fixed value storage circuit 354. However, in some embodiments, only the random number is generated and the fixed value is omitted. In some embodiments, the random number may be generated responsive to, at least in part, receipt of an activation command ACT. Optionally, in some embodiments, method 400 may further include programming at least one of a range, a standard deviation, or a mean of the random number, for example, by writing to a mode register.

At block 404, "comparing an access count value for a word line of a memory array to the threshold value" may be performed. The access count value may correspond to a number of times the word line has been accessed. The access count value may be received from a counter circuit, such as counter circuit 228, which may have received the information from counter memory cells, such as counter memory cells 126 and/or 226, located along word lines of a memory array, such as memory array 118. The comparing may be performed by a threshold comparator circuit, such as threshold comparator circuit 230.

Based on the comparing, at block 406, "activating a trigger signal" may be performed. In some embodiments, the threshold comparator circuit may activate the trigger signal, such as TRIG. In some embodiments, the trigger signal may be received by the counter circuit, an aggressor row address register circuit, such as aggressor address register circuit 244, and/or an RHR state control circuit, such as RHR state control circuit 342.

At block 408, "latching a row address of the word line when the trigger signal is activated" may be performed. In some embodiments, this may be performed by the aggressor row address register circuit. In some embodiments, method 400 may further include calculating at least one victim row address based, at least in part, on the row address latched by the aggressor row address register circuit. In some embodiments, this may be performed by a refresh address generator, such as refresh address generator 350. In some embodiments, method 400 may further include performing targeted refresh operations on at least one word line corresponding to the at least one victim row address. The refresh operations may be performed, at least in part, by a row decoder, such as row decoder 108 and/or 308.

Optionally, as shown in block 410, method 400 may include, "asserting a signal on an external pin of a memory device when the trigger signal is activated." In some embodiments, the signal may be asserted by the RHR state control circuit. In some embodiments, the external pin may be a ready-wait pin and/or an alert pin. The signal on the pin may be provided to a device external to the memory, such as memory controller 101.

While the use of a random threshold value has been described herein with reference to memory devices where accesses of all word lines are tracked for purposes of determining aggressor word lines, random threshold values as disclosed herein may be used with memory devices that use sampling techniques for determining aggressor rows such as those described in U.S. Pat. No. 11,043,254 and U.S. patent application Ser. No. 16/428,625, which are incorporated herein by reference for any purpose.

Figure 5:
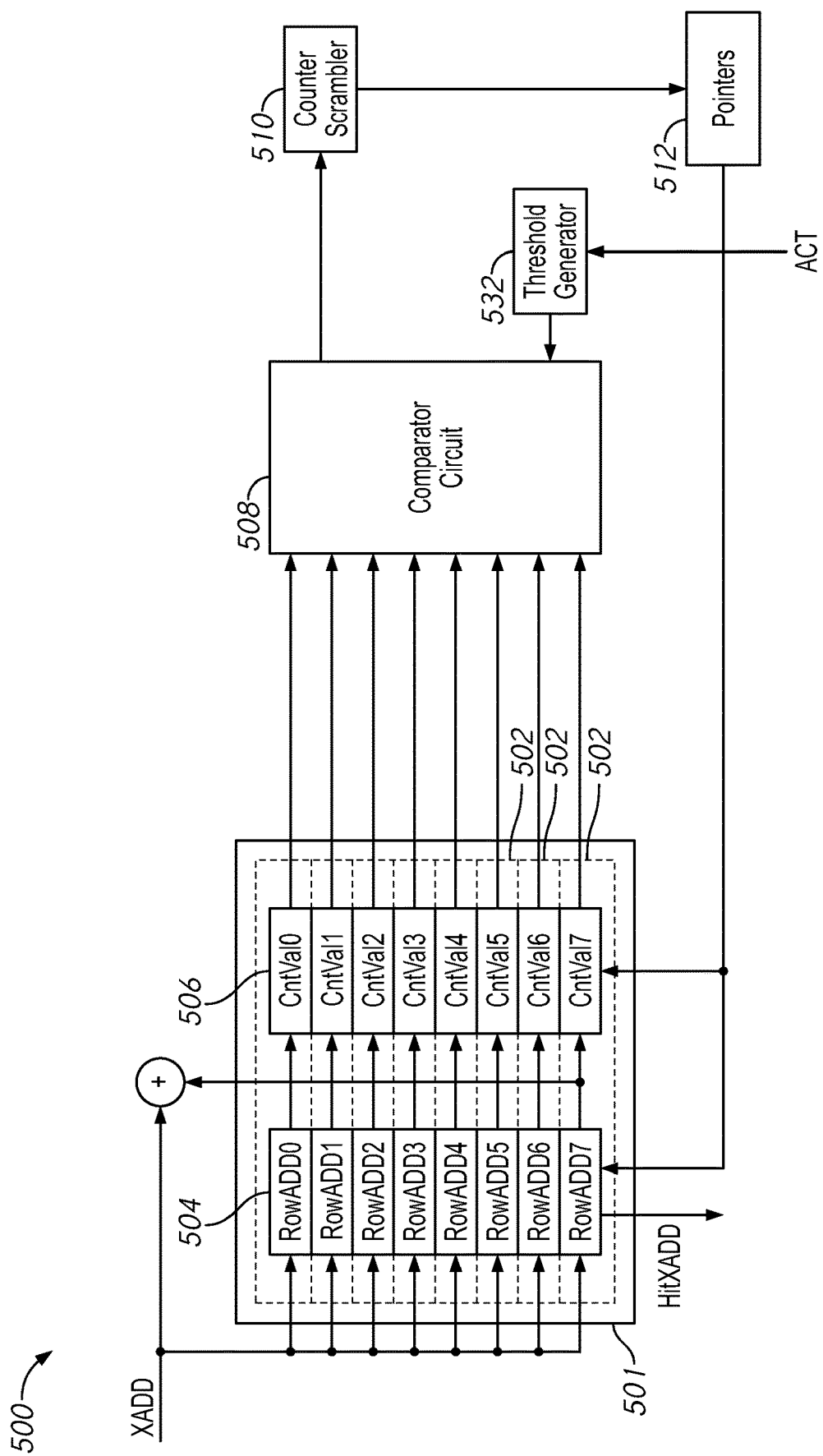
FIG. 5 is an example aggressor row detector circuit 5 according to an embodiment of the present disclosure.

FIG. 5 is an example aggressor row detector circuit according to an embodiment of the present disclosure. In some embodiments, aggressor row detector circuit 500 may be included in memory devices that use sampling techniques to determine aggressor rows rather than including counter memory cells with word lines of the memory array. In some embodiments, the aggressor row detector circuit 500 may replace the aggressor address register 244 shown in FIG. 2.

The aggressor row detector circuit 500 may include a stack 501. The stack 501 may be a content addressable memory (CAM) stack in some embodiments. The stack 501 may include multiple registers (e.g., files) 502, each of which may have corresponding fields 504, 506. In the embodiment shown in FIG. 5, each register includes a field 504 configured to store a row address (RowADD0-7) and a field 506 configured to store a corresponding count value (ACntVal0-7). In some embodiments, the fields 506 may replace the counter circuit 228. The fields 506 storing the count values may be coupled to a comparator 508 which may be coupled to pointers 512 through a counter scrambler 510. In some embodiments, the fields 504 storing row addresses may be coupled to one or more refresh address generators, such as refresh address generator 250 in FIG. 2, and provide a matched address HitXADD to the refresh address generator. While the example in FIG. 5 shows eight registers 502 in the stack 501, it is understood that the stack could include fewer or more registers. For example, the stack 501 could have 128 registers. In another example, the stack 501 could have 1,024 registers.

Each time a row address XADD is provided to the registers 502, the row address XADD may be compared to the fields 504. If the current row address XADD is already stored in one of the registers 502, then the count value in field 506 associated with the matching row address in field 504 may be adjusted (e.g., increased). If the current row address XADD is not already stored in one of the registers 502, it may be added to the registers 502. If there is an open register (e.g., a register without a row address) then the row address XADD may be stored in the open register. If there is not an open register, then the register 502 associated with the count value which has the lowest value (as indicated by the pointers 512) may have its row address replaced with the current row address XADD and count value reset.

The comparator 508 may compare the count values in fields 506 to a threshold value to determine if a count value for a row address has matched or exceeded the threshold value. In some embodiments, the comparator 508 may replace threshold comparator circuit 230. According to embodiments of the present disclosure, the threshold value may be provided by a threshold generator circuit 532. In some embodiments, the threshold generator circuit 532 may be implemented by threshold generator circuit 232 and/or 332. In some embodiments, the comparator 508 may further compare the count values to determine which row address is associated with the lowest count value. The fields 506 corresponding to the minimum count value and count values that meet or exceed the threshold value may be provided to a counter scrambler 510, which may match the above threshold value fields and minimum count value field to their respective associated row address fields 504. The pointers 512 may point to the row addresses in fields 504 associated with count values at or above the threshold value and may point to the fields 504 associated with the minimum count value in fields 506. The threshold value pointer(s) may be used to reset the counts of the row addresses determined to be aggressors. In some embodiments, the threshold value pointer(s) may be used to provide the corresponding row addresses) to the victim address generators as HitXADD. The minimum count value pointer may be used to overwrite a register 502 when a new row address XADD is received and there is no open register 502 to store it in.

If the threshold value used by the comparator 508 was static, an attack could possibly drive the count values for all of the fields 506 up to near the threshold value, then quickly access all of the addresses stored in the fields 504 simultaneously or near simultaneously. This could cause the comparator 508 to trigger all of the addresses in the fields 504 to be provided as HitXADD simultaneously or in a short period of time. This could cause malfunctions downstream (e.g., overload the refresh address generator 250). However, by randomly generating the threshold value each time with the threshold generator circuit 532, the risk may be reduced for similar reasons as those described with reference to FIG. 2.

The systems, methods, and apparatuses may provide dynamic thresholds for detecting aggressor rows. Comparing a number of accesses of a row to a dynamic threshold may reduce the occurrence of several word lines being detected as aggressors in a short period of time. Thus, the length of time the memory device is unavailable due to performing targeted refresh operations may remain within an acceptable time period and/or memory errors due to a high number of aggressor rows may be reduced.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
  a counter circuit coupled to a memory array, the counter circuit configured to determine an access count value of a word line of the memory array based on values stored in count value memory cells of the word line, wherein the access count value indicates a number of times the word line has been accessed;
  a threshold generator circuit configured to provide a threshold value comprising a random number provided by a random number generator of the threshold generator circuit; and
  a comparator circuit coupled to the counter circuit and the threshold generator circuit, the comparator circuit configured to compare the access count value to the threshold value and, based on the comparison, activate a trigger signal.

2. The apparatus of claim 1, further comprising an aggressor row address register configured to receive the trigger signal and latch a row address of the word line when the trigger signal is in an active state.

3. The apparatus of claim 1, wherein the threshold generator circuit further comprises:
  a storage circuit configured to provide a fixed value; and
  a combining circuit configured to combine the fixed value and the random number to provide the threshold value.

4. The apparatus of claim 1, wherein the random number generator comprises a linear feedback shift register.

5. The apparatus of claim 1, wherein the random number generator is configured to generate the random number within a range.

6. The apparatus of claim 5, further comprising a mode register, wherein the range is stored in the mode register.

7. The apparatus of claim 1, further comprising a state control circuit configured to receive the trigger signal, wherein the state control circuit is configured to cause a targeted refresh operation to be performed on at least one victim word line of the word line when the trigger signal is in an active state.

8. The apparatus of claim 7, further comprising an external pin, wherein the state control circuit is further configured to assert a busy signal on the external pin when the trigger signal is in the active state.

9. A method comprising:
  generating a threshold value based, at least in part, on a random number;
  comparing an access count value for a word line of a memory array to the threshold value, wherein the access count value corresponds to a number of times the word line has been accessed;
  based on the comparing, activating a trigger signal; and
  latching a row address of the word line when the trigger signal is activated.

10. The method of claim 9, wherein generating the threshold value comprises:
  generating the random number; and
  combining the random number and a fixed value.

11. The method of claim 10, wherein combining the random number and the fixed value comprises summing the random number and the fixed value.

12. The method of claim 10, further comprising programming at least one of a range, a standard deviation, or a mean of the random number.

13. The method of claim 10, further comprising receiving an activation command, wherein the random number is generated responsive to the activation command.

14. The method of claim 9, further comprising:
  calculating at least one victim row address based, at least in part, on the row address; and
  performing targeted refresh operations on at least one word line corresponding to the at least one victim row address.

15. The method of claim 9, further comprising asserting a busy signal on an external pin of a memory device when the trigger signal is activated.

* * * * *